(12) United States Patent
Bisaiji et al.

(10) Patent No.: US 9,517,436 B2
(45) Date of Patent: Dec. 13, 2016

(54) EXHAUST PURIFICATION SYSTEM OF INTERNAL COMBUSTION ENGINE

(75) Inventors: Yuki Bisaiji, Susono (JP); Kohei Yoshida, Gotemba (JP); Mikio Inoue, Susono (JP); Kohki Nakamura, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/130,414

(22) PCT Filed: Sep. 10, 2012

(86) PCT No.: PCT/JP2012/073088
§ 371 (c)(1),
(2), (4) Date: Dec. 31, 2013

(87) PCT Pub. No.: WO2014/038088
PCT Pub. Date: Mar. 13, 2014

(65) Prior Publication Data
US 2015/0224446 A1    Aug. 13, 2015

(51) Int. Cl.
*B01D 53/94* (2006.01)
*F01N 3/021* (2006.01)
(Continued)

(52) U.S. Cl.
CPC .......... *B01D 53/9431* (2013.01); *F01N 3/021* (2013.01); *F01N 3/0253* (2013.01); *F01N 3/0814* (2013.01); *F01N 3/0842* (2013.01); *F01N 3/0871* (2013.01); *F01N 3/2066* (2013.01); *F01N 2610/03* (2013.01); *F01N 2610/144* (2013.01); *F01N 2610/1453* (2013.01); *F01N 2900/1808* (2013.01)

(58) Field of Classification Search
None
See application file for complete search history.

(56) References Cited

U.S. PATENT DOCUMENTS

2008/0022670 A1   1/2008  Ichikawa
2011/0214415 A1*  9/2011  Thomas ................. F01N 3/035
                                                                60/297
(Continued)

FOREIGN PATENT DOCUMENTS

EP    2 460 987 A1    6/2012
EP    2460987 A1 *    6/2012    ......... B01D 53/9422
(Continued)

*Primary Examiner* — Tom P. Duong
*Assistant Examiner* — Jelitza Perez
(74) *Attorney, Agent, or Firm* — Oliff PLC

(57) ABSTRACT

An internal combustion engine wherein an exhaust purification catalyst and hydrocarbon feed valve are arranged in an engine exhaust passage and wherein the $NO_X$ which is contained in the exhaust gas is removed by injection of hydrocarbons from the hydrocarbon feed valve by a predetermined period. Hydrocarbons are injected from the hydrocarbon feed valve toward the upstream side of the engine exhaust passage. When hydrocarbons are injected from the hydrocarbon feed valve by a predetermined period, the injection pressure of the hydrocarbons is made to gradually fall from injection start to injection end in the injection time period of each injection.

5 Claims, 19 Drawing Sheets

(51) Int. Cl.
*F01N 3/08* (2006.01)
*F01N 3/025* (2006.01)
*F01N 3/20* (2006.01)

(56) References Cited

U.S. PATENT DOCUMENTS

| | | |
|---|---|---|
| 2012/0131908 A1 | 5/2012 | Bisaiji et al. |
| 2013/0081378 A1 | 4/2013 | Bisaiji et al. |
| 2013/0263581 A1 | 10/2013 | Nagaoka et al. |
| 2013/0315790 A1 | 11/2013 | Bisaiji et al. |

FOREIGN PATENT DOCUMENTS

| | | |
|---|---|---|
| EP | 2 495 410 A1 | 9/2012 |
| JP | A-2002-38941 | 2/2002 |
| JP | A-2008-51089 | 3/2008 |
| JP | A-2011-190803 | 9/2011 |
| JP | A-2011-220302 | 11/2011 |
| JP | A-2012-127300 | 7/2012 |
| WO | WO 2011/114499 A1 | 9/2011 |
| WO | WO 2012/108059 A1 | 8/2012 |

* cited by examiner

EXHAUST GAS FLOW

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges an exhaust purification catalyst in an engine exhaust passage, which arranges a hydrocarbon feed valve upstream of the exhaust purification catalyst inside the engine exhaust passage, where precious metal catalysts are carried on exhaust gas flow surfaces of the exhaust purification catalyst, where basic exhaust gas flow surface parts are formed around the precious metal catalysts, and which injects hydrocarbons from the hydrocarbon feed valve by a predetermined period at the time of engine operation and thereby removes the $NO_X$ which is contained in the exhaust gas (for example, see Patent Literature 1). In this internal combustion engine, even if the temperature of the exhaust purification catalyst becomes a high temperature, a high $NO_X$ purification rate can be obtained.

CITATIONS LIST

Patent Literature

Patent Literature 1: WO2011/114499A1

SUMMARY OF INVENTION

Technical Problem

In this internal combustion engine, to remove the $NO_X$ well while reducing the amount of consumption of hydrocarbons which are injected from the hydrocarbon feed valve, it can be said to be preferable to gather the hydrocarbons which are injected from the hydrocarbon feed valve in the engine exhaust passage as much as possible, that is, to raise the concentration of hydrocarbons in the exhaust gas as much as possible. However, in the above-mentioned internal combustion engine, this point is not sufficiently studied.

An object of the present invention is to provide an exhaust purification system of an internal combustion engine capable of obtaining a high $NO_X$ purification rate while reducing the amount of consumption of hydrocarbons for removal of $NO_x$.

Solution to Problem

According to the present invention, there is provided an exhaust purification system of an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on exhaust gas flow surfaces of the exhaust purification catalyst, basic exhaust gas flow surface parts are formed around the precious metal catalysts, the exhaust purification catalyst has a property of reducing $NO_x$ which is contained in an exhaust gas if a concentration of hydrocarbons which flow into the exhaust purification catalyst is made to vibrate by within a predetermined range of amplitude and within a predetermined range of period and has a property of being increased in storage amount of $NO_x$ which is contained in the exhaust gas if the vibration period of the hydrocarbon concentration is made longer than the predetermined range, and, at the time of engine operation, hydrocarbons are injected from the hydrocarbon feed valve by the predetermined period to thereby remove the $NO_x$ which is contained in the exhaust gas, wherein hydrocarbons are injected from the hydrocarbon feed valve toward an upstream side of the engine exhaust passage and, when hydrocarbons are injected from the hydrocarbon feed valve by the predetermined period, an injection pressure of hydrocarbons is gradually reduced from a start of injection toward an end of injection in an injection period of each injection, the injection pressure of hydrocarbons at the time of the start of injection and the injection pressure of hydrocarbons at the time of the end of injection being set to injection pressures whereby hydrocarbons which are injected later are superposed with previously injected group of hydrocarbons.

Advantageous Effects of Invention

It is possible to obtain a high $NO_X$ purification rate while reducing the amount of consumption of hydrocarbons for removing the $NO_X$.

DESCRIPTION OF EMBODIMENTS

Figure 1:
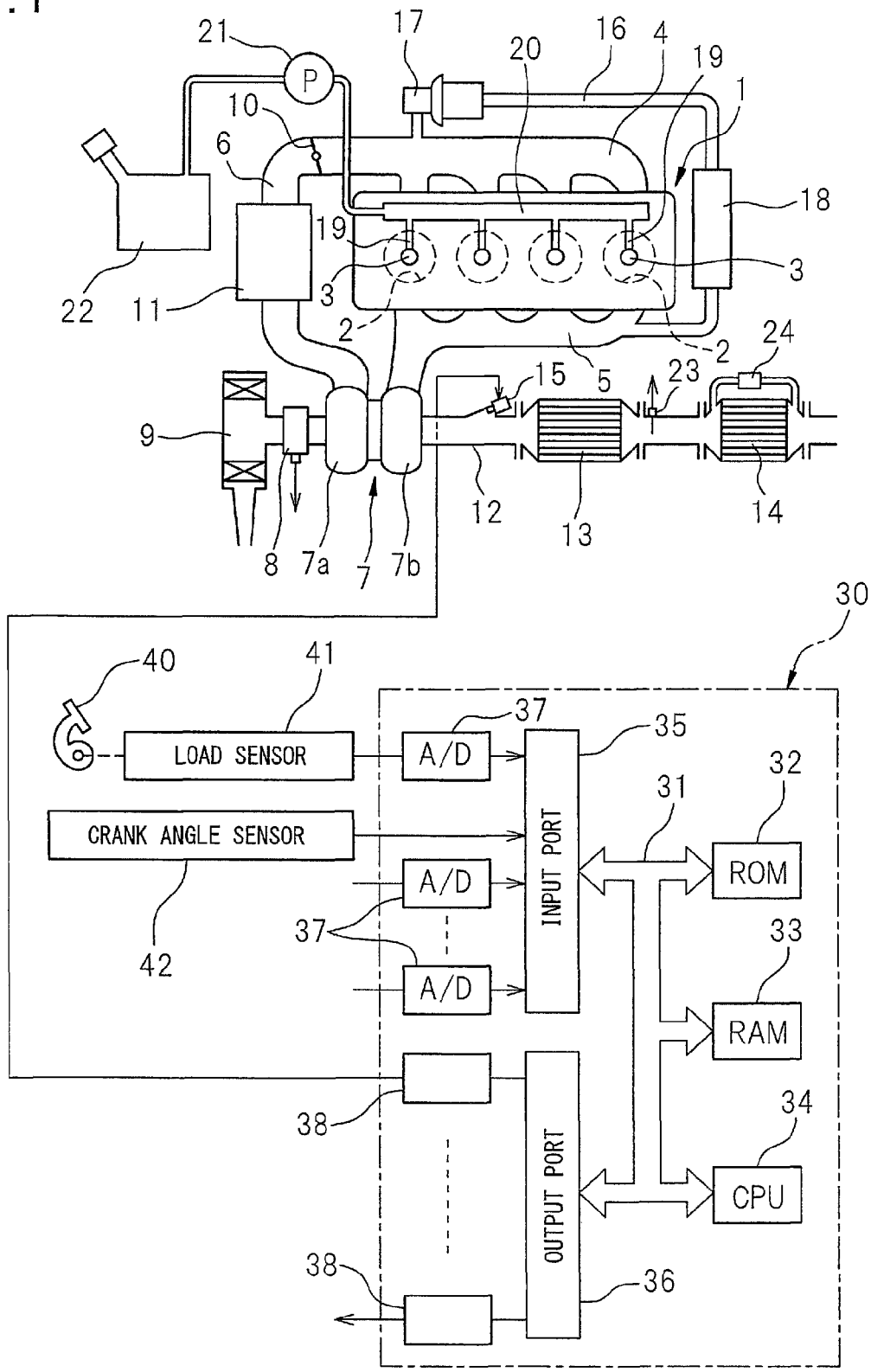
FIG. 1 is an overall view of a compression ignition type internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to the inlet of an exhaust turbine 7b of the exhaust turbocharger 7, and the outlet of the exhaust turbine 7b is connected through an exhaust pipe 12 to the inlet of an exhaust purification catalyst 13. The outlet of the exhaust purification catalyst 13 is connected to a particulate filter 14. In the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the present invention, hydrocarbons are injected toward the upstream side in exhaust pipe 12 from the hydrocarbon feed valve 15. Note that, in the embodiment shown in FIG. 1, diesel oil is used as the hydrocarbons which are fed from the hydrocarbon feed valve 15. On the other hand, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. An electronically controlled EGR control valve 17 is arranged in the EGR passage 16, and around the EGR passage 16, a cooling device 18 is arranged for cooling the exhaust gas which flows through the inside of the EGR passage 16. In the embodiment which is shown in FIG. 1, the engine cooling water is guided to the inside of the cooling device 18 where the engine cooling water is used to cool the exhaust gas. Further, each fuel injector 3 is connected through a fuel feed tube 19 to a common rail 20. This common rail 20 is connected through an electronically controlled variable discharge fuel pump 21 to a fuel tank 22. The fuel which is stored in the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust purification catalyst 13, and a differential pressure sensor 24 for detecting the differential pressure before and after the particulate filter 14 is attached to the particulate filter 14. The output signals of these temperature sensor 23, differential pressure sensor 24 and intake air amount detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator for driving the throttle valve 10, hydrocarbon feed valve 15, EGR control valve 17 and fuel pump 21.

Figure 2:
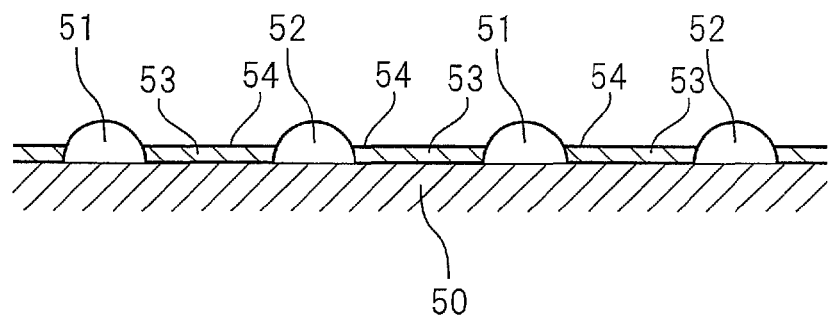
FIG. 2 is a view which schematically shows the surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the "basic exhaust gas flow surface parts 54".

On the other hand, in FIG. 2, the precious metal catalyst 51 is comprised of platinum Pt, while the precious metal catalyst 52 is comprised of rhodium Rh. Note that, in this case, both the precious metal catalysts 51 and 52 may be comprised from platinum Pt. Further, on the catalyst carrier

50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of at least one of platinum Pt, rhodium Rh and palladium Pd.

Figure 3:
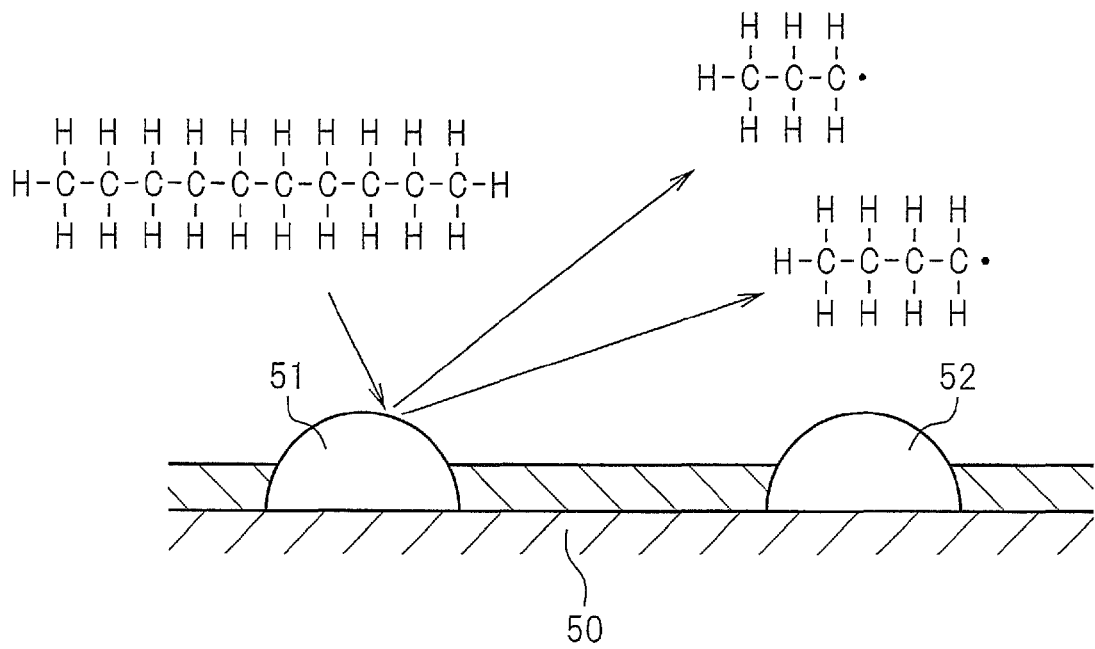
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the catalyst 51.

Figure 4:
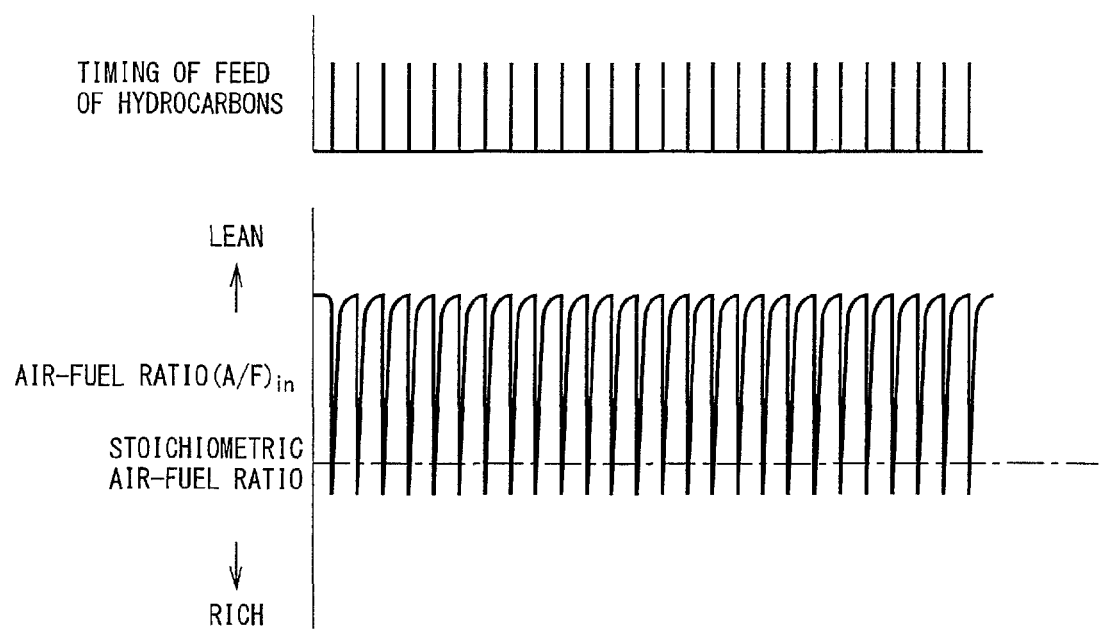
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
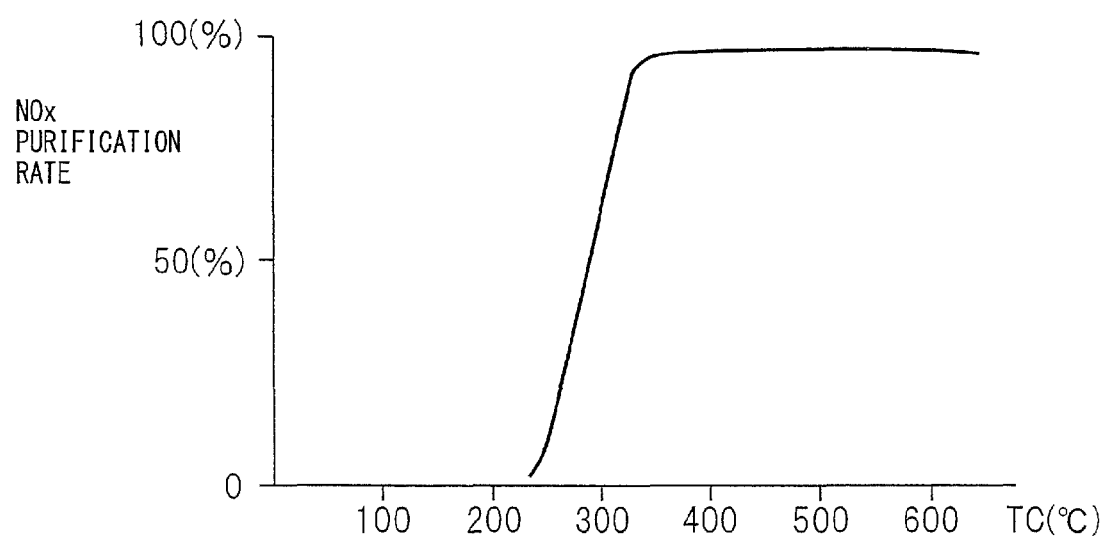
FIG. 5 is a view which shows an $NO_X$ purification rate.

FIG. 5 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_X$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate is obtained even in a 400° C. or higher high temperature region.

Figure 6A:
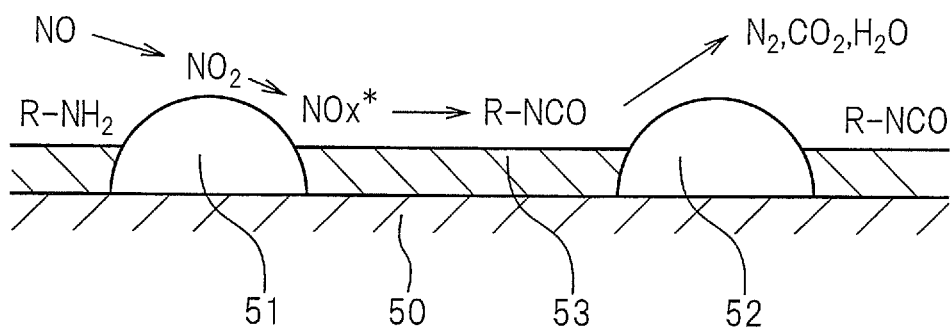
FIGS. 6A and 6B are views for explaining an oxidation reduction reaction in an exhaust purification catalyst.
Figure 6B:
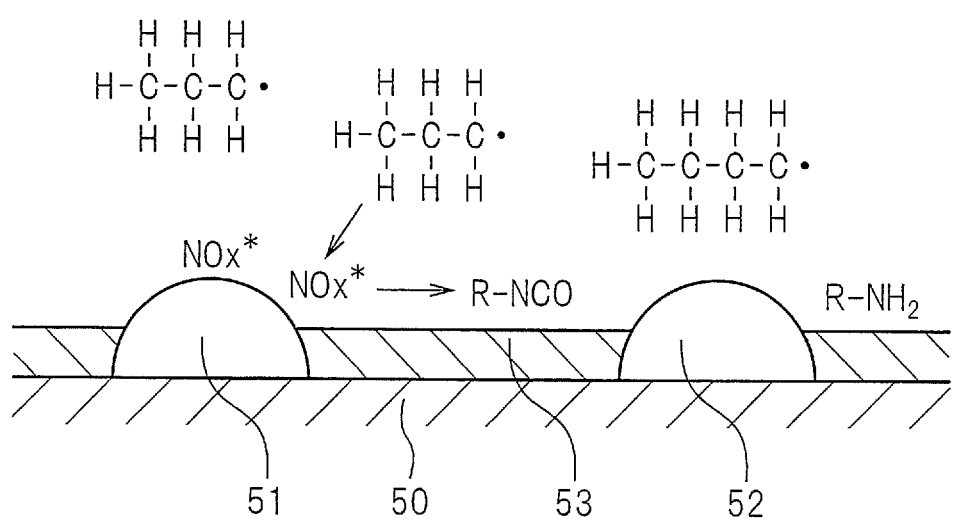

Furthermore, at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13. It is learned that the reducing intermediates play a central role in obtaining a high $NO_X$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed and thereby the concentration of oxygen around the reducing intermediates becomes higher, the reducing intermediates react with the $NO_X$ in the exhaust gas and the active $NO_X^*$, or react with the surrounding oxygen, or break down on their own. Due to this, as shown in FIG. 6A, the reducing intermediates R—NCO and R—$NH_2$ are converted to $N_2$, $CO_2$, and $H_2O$, therefore the $NO_X$ is removed.

In this way, in the exhaust purification catalyst 13, by making the concentration of hydrocarbons which flow into the exhaust purification catalyst 13 higher, reducing intermediates are produced. When the concentration of hydrocarbons which flow into the exhaust purification catalyst 13 is lowered, then the oxygen concentration is raised, the reducing intermediates react with the $NO_X$ in the exhaust gas, the active $NO_X^*$ and oxygen, or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas, the active $NO_X^*$ and oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas, the active $NO_X^*$ and oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in this embodiment of the present invention, to make the $NO_X$ which is contained in the exhaust gas and the reformed hydrocarbons react and produce the reducing intermediates R—NCO and R—$NH_2$ containing nitrogen and hydrocarbons, the precious metal catalysts 51 and 52 are carried on the exhaust gas flow surface of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51 and 52. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Now, as will be understood from the above explanation, to remove $NO_X$ well, it is necessary to raise the concentration of hydrocarbons up to a concentration sufficiently high to produce the reducing intermediates. In this case, if increasing the amount of feed of hydrocarbons, it is possible to raise the concentration of hydrocarbons, but if increasing the amount of feed of hydrocarbons, the amount of consumption of hydrocarbons ends up increasing along with this. Therefore, the inventors discovered a method of feeding hydrocarbons which is able to raise the concentration of hydrocarbons up to a concentration sufficiently high for producing the reducing intermediates while suppressing the amount of consumption of hydrocarbons. Next, this method of feeding hydrocarbons will be explained while referring to FIG. 7 to FIG. 9B.

Figure 7:
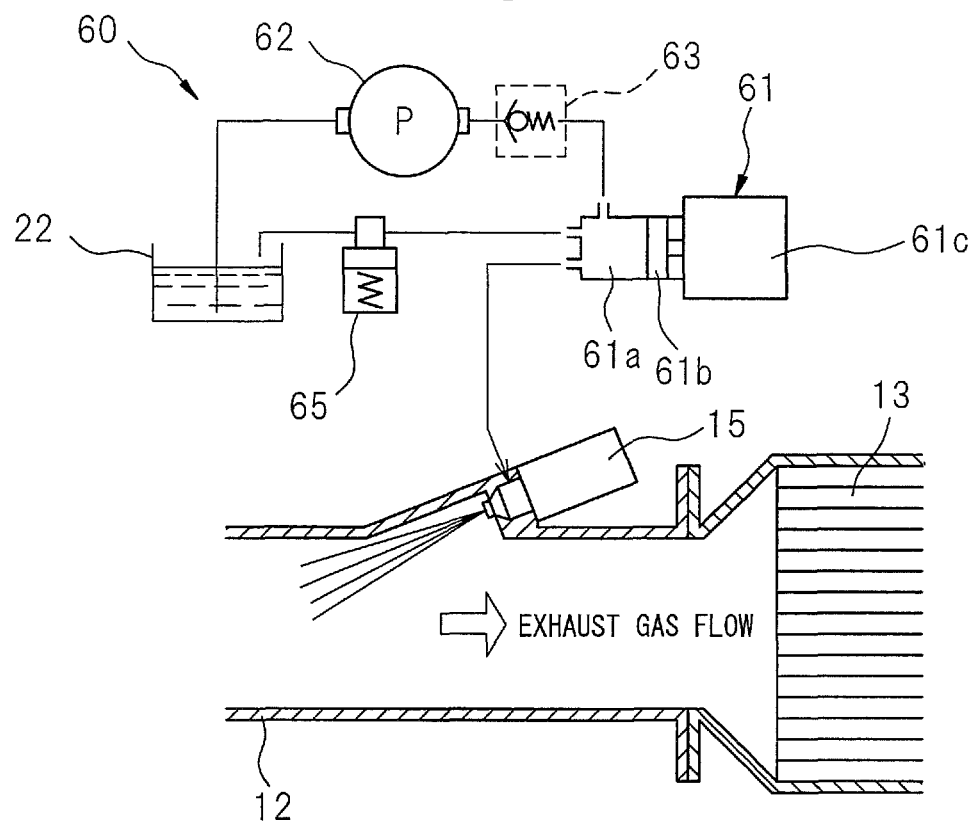
FIG. 7 is an overall view of a hydrocarbon injection control device.

FIG. 7 shows an enlarged view of the area around the hydrocarbon feed valve 15 which is shown in FIG. 1 and one example of the illustrated hydrocarbon injection control device 60. Referring to FIG. 7, the hydrocarbon injection control device 60 is comprised of a volume-adjusting chamber 61a which is filled with hydrocarbons, that is, fuel, an adjustment piston 61b for adjusting the volume of the volume-adjusting chamber 61a, and an actuator 61c for driving the adjustment piston 61b. The fuel in the fuel tank 22 is pressurized by the pressurizing pump 62, and the pressurized fuel is fed a little by little into the volume-adjusting chamber 61a through a check valve 63 which allows flow only toward the volume-adjusting chamber 61a. The pressurized fuel in the volume-adjusting chamber 61a is on the one hand fed to the hydrocarbon feed valve 15 and on the other hand is returned to the fuel tank 22 through a relief valve 65 which enables control of the relief pressure. If the fuel pressure in the volume-adjusting chamber 61a exceeds the relief pressure of the relief valve 65, the relief valve 65 opens. Due to this, the fuel pressure in the volume-adjusting chamber 61a is maintained at the relief pressure of the relief valve 65.

Figure 8:
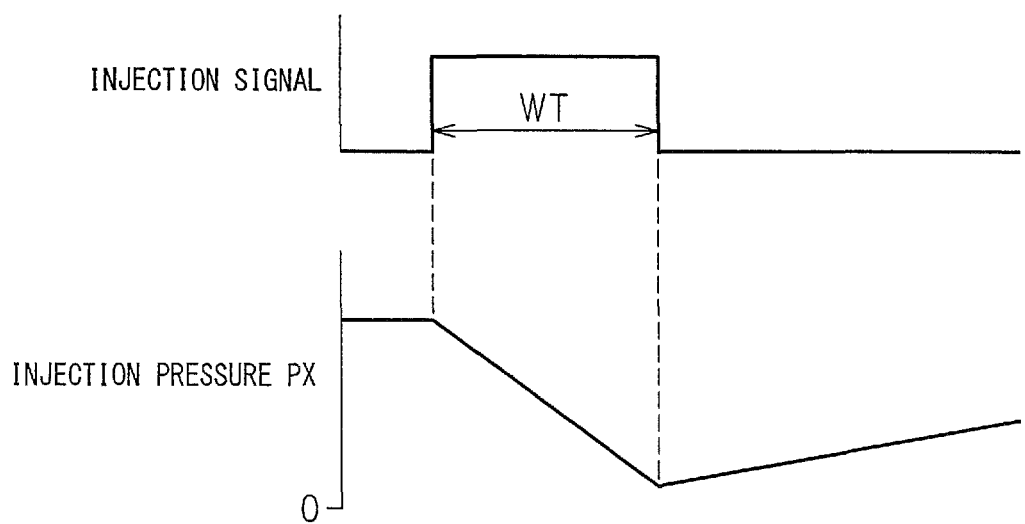
FIG. 8 is a view which shows changes in an injection pressure PX.

FIG. 8 shows changes in an injection signal for the hydrocarbon feed valve 15 and the pressure of the fuel which is fed into the hydrocarbon feed valve 15, that is, the injection pressure PX of the hydrocarbon feed valve 15. The hydrocarbon feed valve 15 opens when an injection signal is generated whereby fuel injection from the hydrocarbon feed valve 15 is started. During the time period WT where the injection signal is generated, fuel injection from the hydrocarbon feed valve 15 is continued. The fuel pressure in the volume-adjusting chamber 61a before fuel injection is started becomes the relief pressure of the relief valve 65. Therefore, the injection pressure PX of the hydrocarbon feed valve 15 at the time of injection start also becomes this relief pressure. Next, if fuel injection is started, the fuel pressure in the volume-adjusting chamber 61a falls. Along with this, the injection pressure PX of the hydrocarbon feed valve 15 also falls. The fall in the injection pressure PX continues until the end of fuel injection from the hydrocarbon feed valve 15. When the fuel injection ends, the action of feed of pressurized fuel from the pressurizing pump 62 causes the fuel pressure inside of the volume-adjusting chamber 61a to start to rise.

If the volume of the volume-adjusting chamber 61a is made to increase by the adjustment piston 61b, the amount of pressurized fuel in the volume-adjusting chamber 61a increases. If the amount of the pressurized fuel in the volume-adjusting chamber 61a increases, the amount of fall of the fuel pressure in the volume-adjusting chamber 61a when exactly a certain amount is injected becomes smaller. Therefore, if the volume of the volume-adjusting chamber 61a is made to increase, the fall of the fuel pressure in the volume-adjusting chamber 61a when the fuel is injected becomes slower and therefore the speed of fall of the injection pressure PX from injection start to injection end becomes slower. On the other hand, when the volume of the volume-adjusting chamber 61a is constant, the higher the fuel pressure in the volume-adjusting chamber 61a which is determined by the relief pressure of the relief valve 65, the higher the injection pressure PX at the time of injection start. Therefore, the injection pressure PX at the time of injection start and the speed of fall of the injection pressure PX from injection start to injection end can be freely set by changing the relief pressure and volume of the volume-adjusting chamber 61a.

Figure 9A:
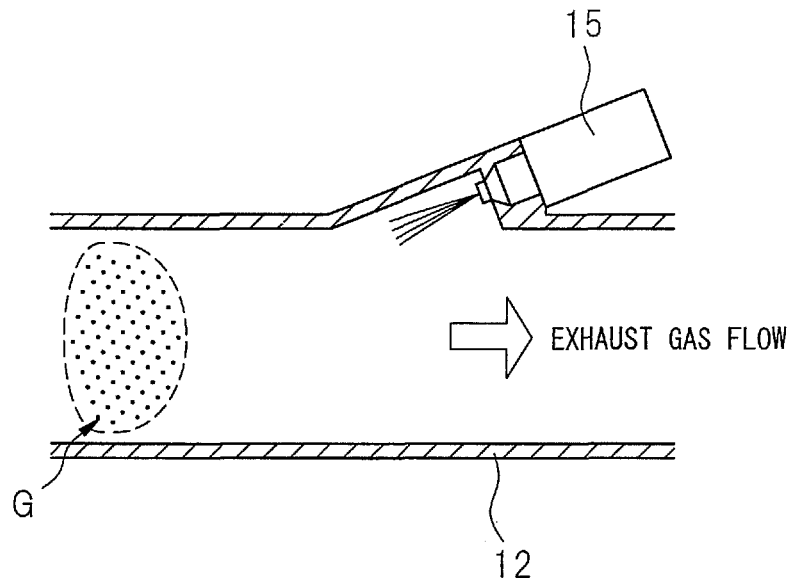
FIGS. 9A and 9B are views for explaining the behavior of the group of hydrocarbons injected from a hydrocarbon injector.
Figure 9B:
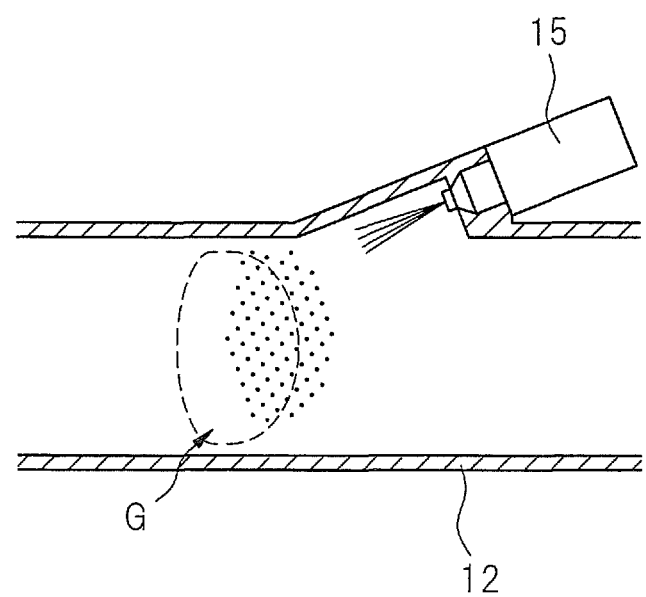

Next, while referring to FIGS. 9A and 9B, the method of feeding hydrocarbons which can raise the concentration of hydrocarbons while suppresing the amount of consumption of hydrocarbons will be explained. FIG. 9A illustrates the region of collection of hydrocarbons which are injected first from the hydrocarbon feed valve 15, for example, the region of collection of hydrocarbons which are injected at the start of the injection time period, as the group of hydrocarbons G. On the other hand, FIG. 9B shows later injection which is performed from the hydrocarbon feed valve 15 when the previously injected group of hydrocarbons G rides the flow of exhaust gas and approaches the hydrocarbon feed valve 15 a little while after injection start, for example, when the hydrocarbons are later injected from the hydrocarbon feed valve 15 at the end of the injection time period. In this case, as shown in FIG. 9B, if the later injected hydrocarbons which are shown by the black dots are superposed with the previously injected group of hydrocarbons G which are shown by the broken lines, the concentration of hydrocarbons rises and as a result a sufficient amount of reducing intermediates can be produced.

At this time, to make the later injected hydrocarbons superpose with the previously injected group of hydrocarbons G, it is necessary to lower the penetrating force of the later injected hydrocarbons from the penetrating force of the previously injected hydrocarbons. To lower the penetrating force of the hydrocarbons which are injected, it is necessary to lower the injection pressure PX. Therefore, in the present invention, to make the later injected hydrocarbons superpose with the previously injected group of hydrocarbons G, the injection pressure PX at the time of the later injection is lowered compared with the injection pressure PX at the time of the previous injection. Specifically speaking, in the present invention, as shown in FIG. 8, the injection pressure PX of hydrocarbons is made to gradually fall from injection start toward injection end during the injection time period WT so that the injection pressure PX at the time of injection end is lowered compared with injection pressure PX at the time of injection start.

Note that, in the example which is shown in FIGS. 7 and 8, the injection pressure PX at the time of injection start is made a gauge pressure of 0.4 MPa to 0.5 MPa, while the injection pressure PX at the time of injection end is substantially atmospheric pressure. That is, in the example which is shown in FIGS. 7 and 8, the relief pressure and the volume of the volume-adjusting chamber 61a are adjusted so that the injection pressure PX at the time of injection start becomes a gauge pressure of 0.4 MPa to 0.5 MPa and the injection pressure PX at the time of injection end becomes substantially atmospheric pressure. In this case, the later injected hydrocarbons is superposed with the previously injected group of hydrocarbons G. As a result, it becomes possible to raise the concentration of hydrocarbons while suppressing the amount of consumption of hydrocarbons. In this way, in the present invention, the injection pressure PX of hydrocarbons at the time of start of injection and the injection pressure PX of hydrocarbons at the time of end of injection are set to injection pressures PX whereby hydrocarbons which are injected later are superposed with the previously injected group of hydrocarbons G.

Figure 10A:
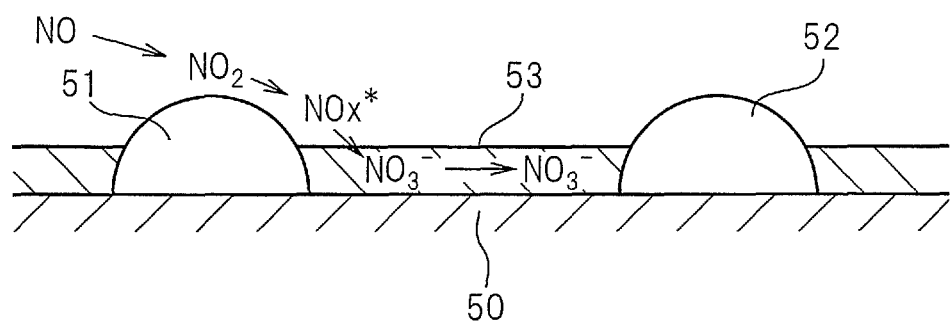
FIGS. 10A and 10B are views for explaining an oxidation reduction reaction in an exhaust purification catalyst.

Now, the vibration period of the hydrocarbon concentration in the exhaust gas flowing into the exhaust purification catalyst 13 is made the vibration period required for continuation of the production of the reducing intermediates R—NCO and R—$NH_2$, that is, within the previously mentioned predetermined range of period. In this case, if the vibration period of the hydrocarbon concentration, that is, the feed period of the hydrocarbons HC, is made longer than this predetermined range of period, the reducing intermediates R—NCO and R—$NH_2$ disappear from the surface of the basic layer 53. At this time, the active $NO_X$* which was produced on the platinum Pt 53, as shown in FIG. 10A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 10B:
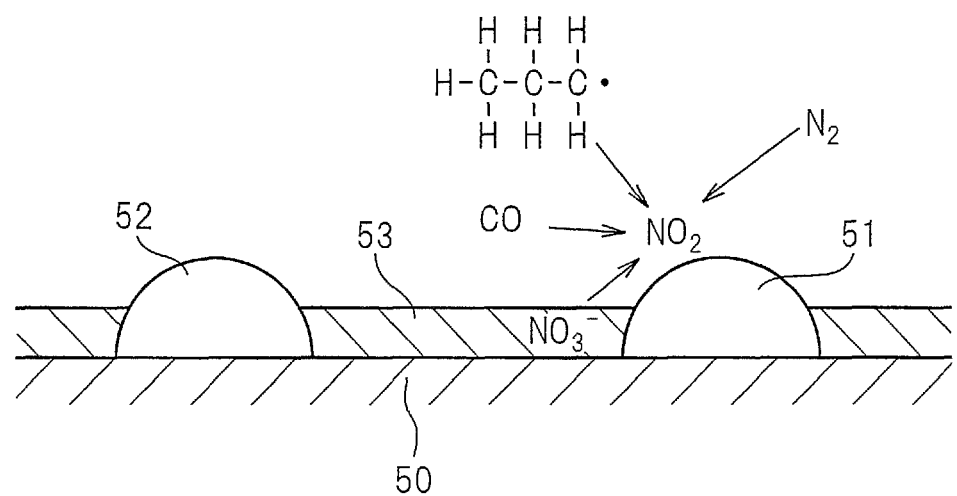

On the other hand, FIG. 10B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 10B, are released from the basic layer 53 in the form of $NO_2$. Next, the released $NO_2$ is reduced by the hydrocarbons HC and CO contained in the exhaust gas.

Figure 11:
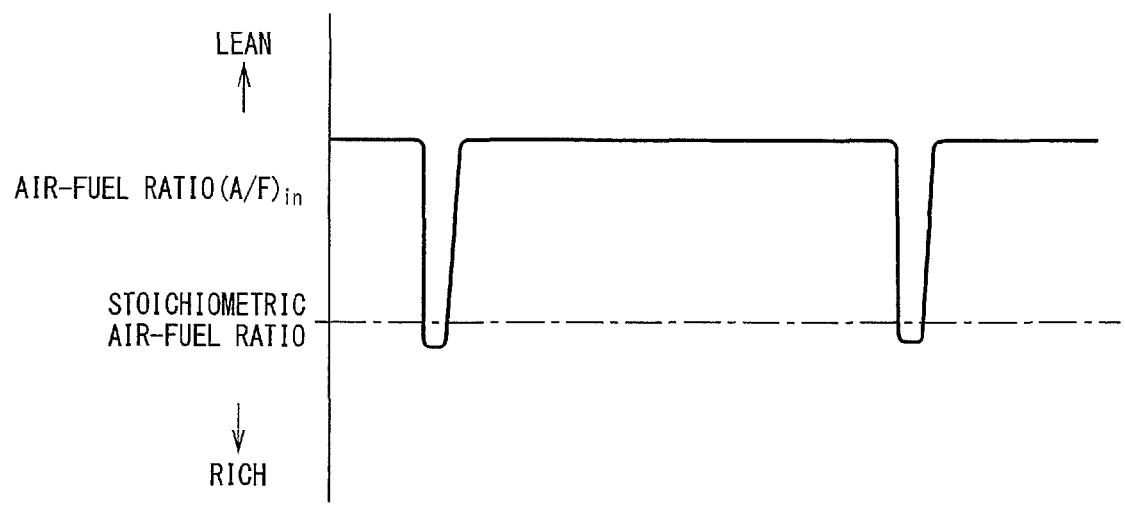
FIG. 11 is a view which shows changes in an air-fuel ratio of exhaust gas which flows into an exhaust purification catalyst.

FIG. 11 shows the case of making the air-fuel ratio (A/F)in of the exhaust gas which flows into the exhaust purification catalyst 13 temporarily rich slightly before the $NO_X$ absorption ability of the basic layer 53 becomes saturated. Note that, in the example shown in FIG. 11, the time interval of this rich control is 1 minute or more. In this case, the $NO_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 12:
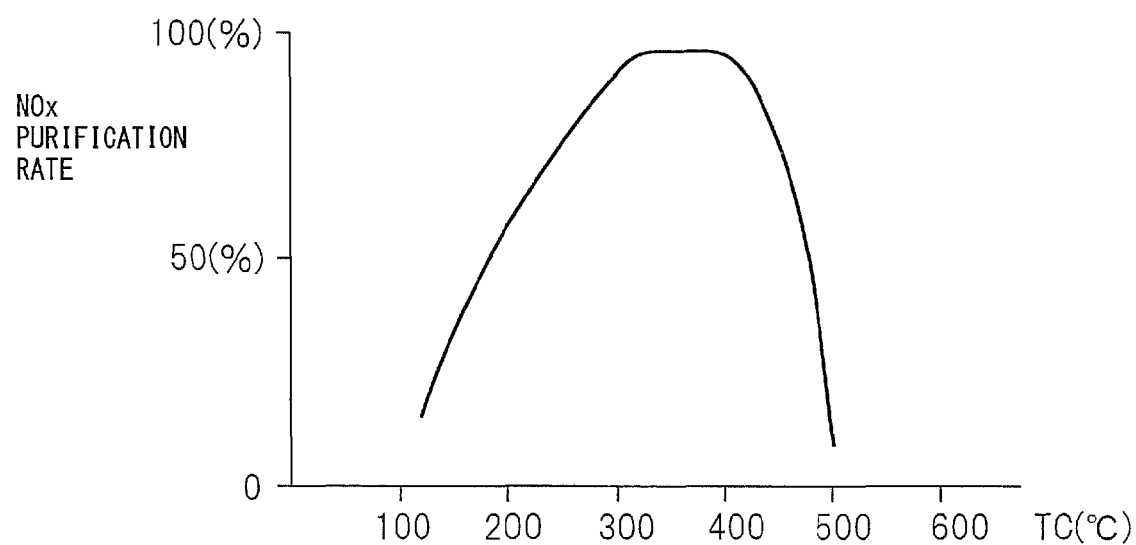
FIG. 12 is a view which shows an $NO_X$ purification rate.

FIG. 12 shows the $NO_X$ purification rate when making the exhaust purification catalyst 13 function as an $NO_X$ storage catalyst in this way. Note that, the abscissa of the FIG. 12 shows the catalyst temperature TC of the exhaust purification catalyst 13. When making the exhaust purification catalyst 13 function as an $NO_X$ storage catalyst, as shown in FIG. 12, when the catalyst temperature TC is 300° C. to 400° C., an extremely high $NO_X$ purification rate is obtained, but when the catalyst temperature TC becomes a 400° C. or higher high temperature, the $NO_X$ purification rate falls.

In this way, when the catalyst temperature TC becomes 400° C. or more, the $NO_X$ purification rate falls because if the catalyst temperature TC becomes 400° C. or more, $NO_X$ is less easily stored and the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate. However, in the new $NO_X$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high $NO_X$ purification rate is obtained.

Therefore, in the present invention, in an exhaust purification system of an internal combustion engine in which the exhaust purification catalyst 13 is arrange in the engine exhaust passage, the hydrocarbon feed valve 15 is arrange in the engine exhaust passage upstream of the exhaust purification catalyst 13, precious metal catalysts 51 and 52 are carried on the exhaust gas flow surface of the exhaust purification catalyst 13, basic exhaust gas flow surface parts 54 are formed around the precious metal catalysts 51 and 52, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the hydrocarbons are injected from the hydrocarbon feed valve 15 at this predetermined period to thereby remove the $NO_X$ which is contained in the exhaust gas, to be able to remove $NO_X$ by using this new $NO_X$ purification method while suppressing the consumption of hydrocarbon, the hydrocarbons are injected toward the upstream side of the engine exhaust passage from the hydrocarbon feed valve 15, and, when the hydrocarbons are injected from the hydrocarbon feed valve 15 at the above mentioned predetermined period, the injection pressure of hydrocarbon is gradually reduced from the start of injection to the end of injection in an injection period of each injection.

That is, the $NO_X$ purification method which is shown from FIG. 4 to FIGS. 6A and 6B can be said to be a new $NO_X$ purification method designed to remove $NO_X$ without forming almost any nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become much smaller in amount compared with the case where making the exhaust purification catalyst 13 function as an $NO_X$ storage catalyst. Note that, this new $NO_X$ purification method will be referred to below as the "first $NO_X$ purification method".

Next, referring to FIG. 13 to FIG. 18, this first $NO_X$ purification method will be explained in a bit more detail.

Figure 13:
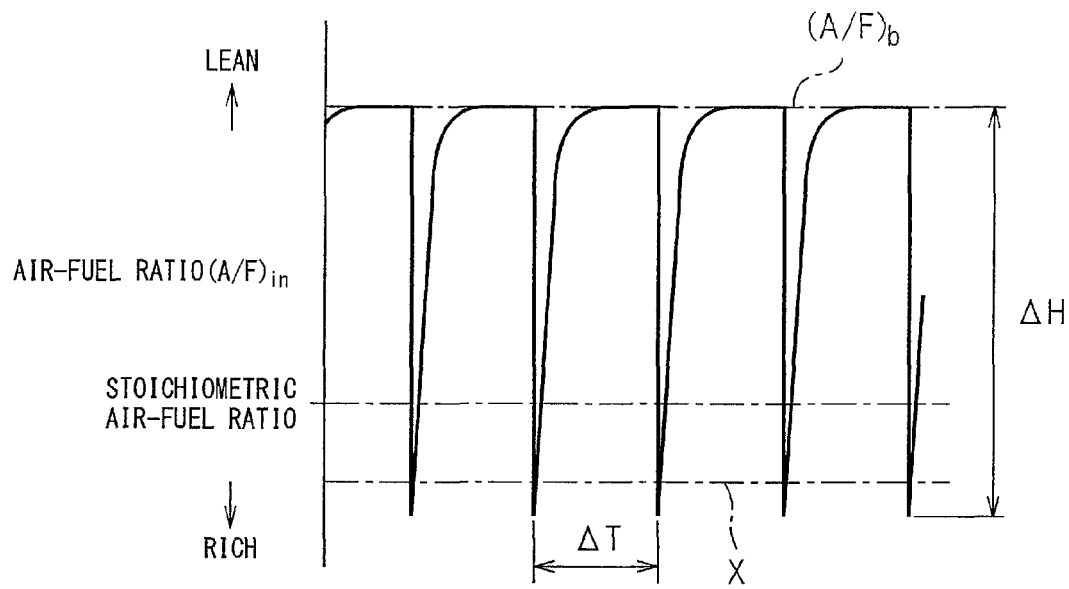
FIG. 13 is a time chart which shows changes in an air-fuel ratio of exhaust gas which flows into an exhaust purification catalyst.

FIG. 13 shows enlarged the change in the air-fuel ratio (A/F)in shown in FIG. 4. Note that, as explained above, the change in the air-fuel ratio (A/F)in of the exhaust gas which flows into this exhaust purification catalyst 13 simultaneously shows the change in concentration of the hydrocarbons which flow into the exhaust purification catalyst 13. Note that, in FIG. 13, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 13, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 13, X shows the upper limit of the air-fuel ratio (A/F)in used for producing the reducing intermediates without the produced active $NO_X$* being stored in the form of nitrates inside the basic layer 53 much at all. To make the active $NO_X$* and the reformed hydrocarbons react to produce reducing intermediates, the air-fuel ratio (A/F)in has to be made lower than this upper limit X of the air-fuel ratio.

In other words, in FIG. 13, X shows the lower limit of the hydrocarbon concentration required for making the active $NO_X$* and reformed hydrocarbons react to produce reducing intermediates. To produce the reducing intermediates, the hydrocarbon concentration has to be made higher than this lower limit X. In this case, whether the reducing intermediates are produced is determined by the ratio of the oxygen concentration and hydrocarbon concentration around the active $NO_X$*, that is, the air-fuel ratio (A/F)in. The upper limit X of the air-fuel ratio required for producing the reducing intermediates will below be called the "demanded minimum air-fuel ratio".

In the example shown in FIG. 13, the demanded minimum air-fuel ratio X is rich, therefore, in this case, to form the reducing intermediates, the air-fuel ratio (A/F)in is instantaneously made the demanded minimum air-fuel ratio X or less, that is, rich. As opposed to this, in the example shown in FIG. 14, the demanded minimum air-fuel ratio X is lean. In this case, the air-fuel ratio (A/F)in is maintained lean while periodically reducing the air-fuel ratio (A/F)in so as to form the reducing intermediates.

In this case, whether the demanded minimum air-fuel ratio X becomes rich or becomes lean depends on the oxidizing power of the exhaust purification catalyst 13. In this case, the exhaust purification catalyst 13, for example, becomes stronger in oxidizing power if increasing the carried amount of the precious metal 51 and becomes stronger in oxidizing power if strengthening the acidity. Therefore, the oxidizing power of the exhaust purification catalyst 13 changes due to the carried amount of the precious metal 51 or the strength of the acidity.

Figure 14:
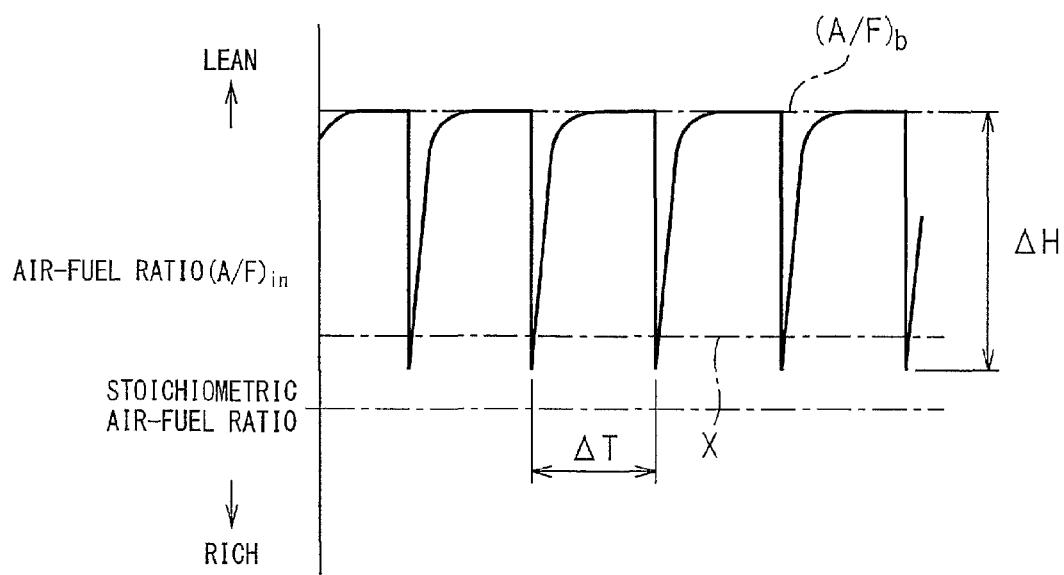
FIG. 14 is a time chart which shows changes in an air-fuel ratio of exhaust gas which flows into an exhaust purification catalyst.

Now, if using an exhaust purification catalyst 13 with a strong oxidizing power, as shown in FIG. 14, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, reducing intermediates can no longer be produced. As opposed to this, when using an exhaust purification catalyst 13 with a strong oxidizing power, as shown in FIG. 13, if making the air-fuel ratio (A/F)in periodically rich, when the air-fuel ratio (A/F)in is made rich, part of the hydrocarbons will not be completely oxidized, but will be partially oxidized, that is, the hydrocarbons will be reformed, consequently reducing intermediates will be produced. Therefore, when using an exhaust purification catalyst 13 with a strong oxidizing power, the demanded minimum air-fuel ratio X has to be made rich.

On the other hand, when using an exhaust purification catalyst 13 with a weak oxidizing power, as shown in FIG. 14, if maintaining the air-fuel ratio (A/F)in lean while periodically lowering the air-fuel ratio (A/F)in, part of the hydrocarbons will not be completely oxidized, but will be partially oxidized, that is, the hydrocarbons will be reformed, and consequently reducing intermediates will be produced. As opposed to this, when using an exhaust purification catalyst 13 with a weak oxidizing power, as shown in FIG. 13, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing power, the demanded minimum air-fuel ratio X has to be made lean.

Figure 15:
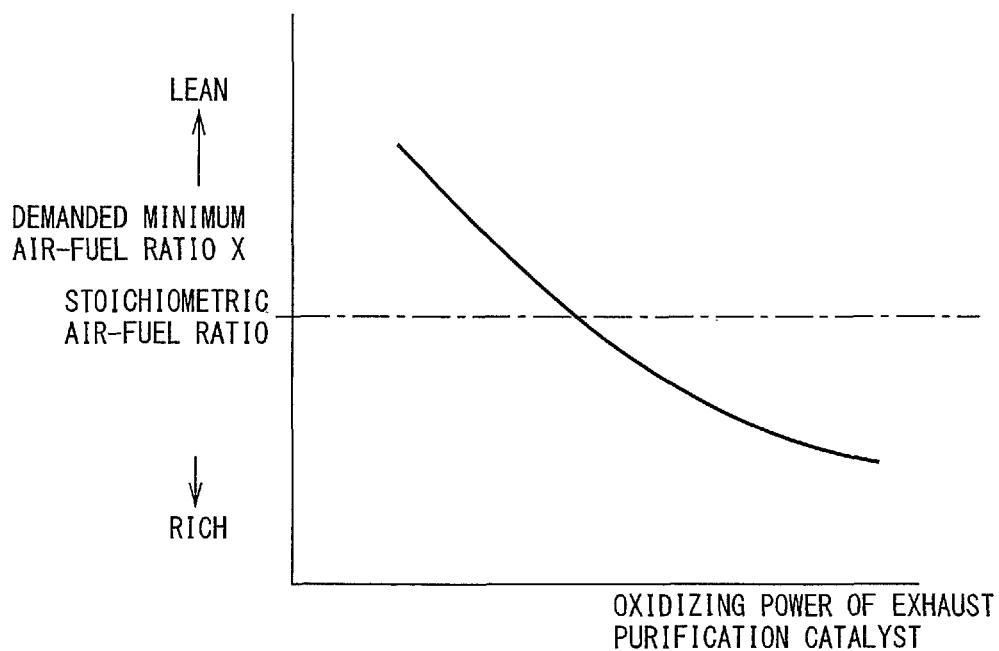
FIG. 15 is a view which shows a relationship between an oxidizing power of an exhaust purification catalyst and a demanded minimum air-fuel ratio X.

That is, it is learned that the demanded minimum air-fuel ratio X, as shown in FIG. 15, has to be reduced the stronger the oxidizing power of the exhaust purification catalyst 13. In this way, the demanded minimum air-fuel ratio X becomes lean or rich due to the oxidizing power of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which do not contribute to the production of the reducing intermediates also increases. In this case, to remove the $NO_X$ well, as explained above, it is necessary to make the excess hydrocarbons oxidize. Therefore, to remove the $NO_X$ well, the larger the amount of excess hydrocarbons, the larger the amount of oxygen which is required.

In this case, if raising the oxygen concentration in the exhaust gas, the amount of oxygen can be increased. Therefore, to remove the $NO_X$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 16:
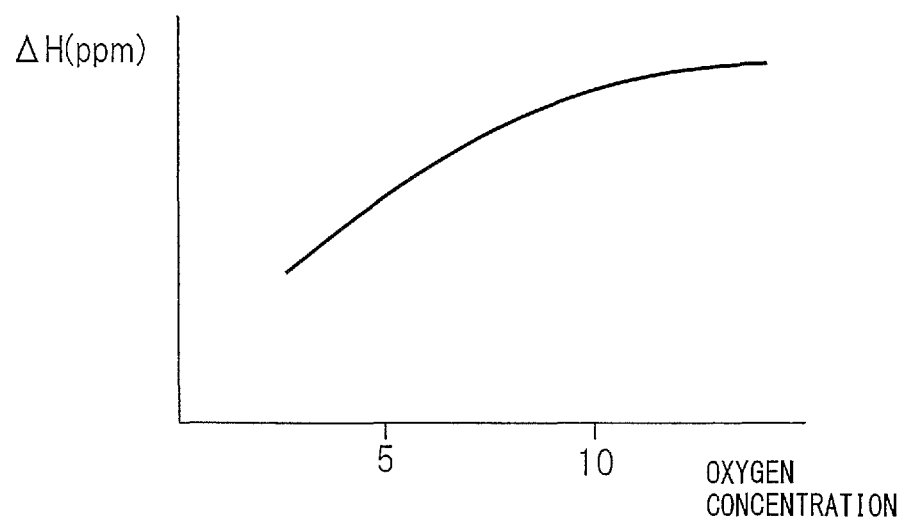
FIG. 16 is a view which shows a relationship between a concentration of oxygen in exhaust gas and an amplitude ΔH of hydrocarbon concentration which gives the same $NO_X$ purification rate.

FIG. 16 shows the relationship between the oxygen concentration in the exhaust gas before the hydrocarbons are fed and the amplitude $\Delta H$ of the hydrocarbon concentration when the same $NO_X$ purification rate is obtained. To obtain the same $NO_X$ purification rate, from FIG. 16, it is learned that the higher the oxygen concentration in the exhaust gas before the hydrocarbons are fed, the greater the amplitude $\Delta H$ of the hydrocarbon concentration has to be made. That is, to obtain the same $NO_X$ purification rate, the higher the base air-fuel ratio (A/F)b, the greater the amplitude $\Delta T$ of the hydrocarbon concentration has to be made. In other words, to remove the $NO_X$ well, the lower the base air-fuel ratio (A/F)b, the more the amplitude $\Delta T$ of the hydrocarbon concentration can be reduced.

Figure 17:
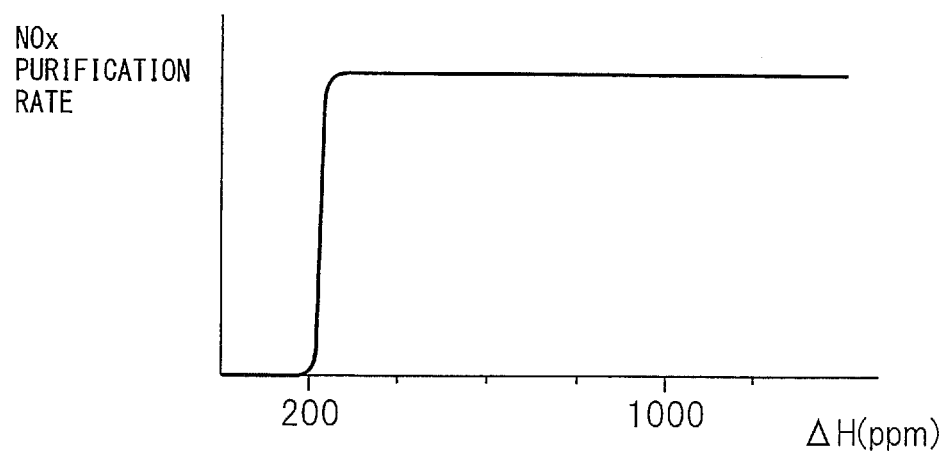
FIG. 17 is a view which shows a relationship between an amplitude ΔH of hydrocarbon concentration and an $NO_X$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_X$ well. The base air-fuel ratio (A/F)b is normally larger than the time of acceleration operation. Therefore, as shown in FIG. 17, if the amplitude $\Delta H$ of the hydrocarbon concentration is 200 ppm or more, an excellent $NO_X$ purification rate can be obtained. On the other hand, it is learned that when the base air-fuel ratio (A/F)b is the highest, if making the amplitude $\Delta H$ of the hydrocarbon concentration 10000 ppm or so, an excellent $NO_X$ purification rate is obtained. Therefore, in the present invention, the predetermined range of the amplitude of the hydrocarbon concentration is made 200 ppm to 10000 ppm.

Figure 18:
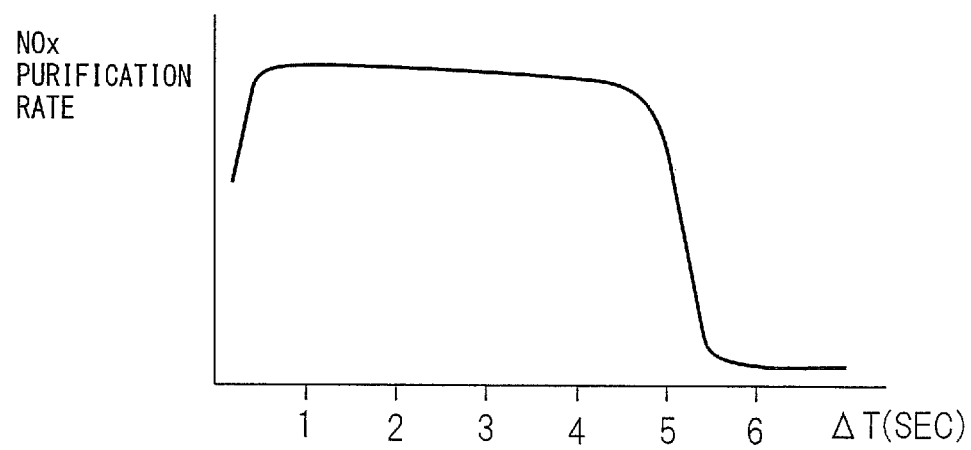
FIG. 18 is a view which shows a relationship between a vibration period ΔT of hydrocarbon concentration and an $NO_X$ purification rate.

Further, if the vibration period $\Delta T$ of the hydrocarbon concentration becomes longer, the time period where the oxygen concentration around the active $NO_X^*$ becomes higher becomes longer in the time period after the hydrocarbons are fed to when the hydrocarbons are next fed. In this case, in the embodiment which is shown in FIG. 1, if the vibration period $\Delta T$ of the hydrocarbon concentration becomes longer than about 5 seconds, the active $NO_X^*$ starts to be absorbed in the form of nitrates inside the basic layer 53. Therefore, as shown in FIG. 18, if the vibration period $\Delta T$ of the hydrocarbon concentration becomes longer than about 5 seconds, the $NO_X$ purification rate falls. Therefore, in the embodiment which is shown in FIG. 1, the vibration period $\Delta T$ of the hydrocarbon concentration has to be made 5 seconds or less.

On the other hand, in this embodiment according to the present invention, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 18, if the vibration period $\Delta T$ of the hydrocarbon concentration becomes about 0.3 second or less, the $NO_X$ purification rate falls. Therefore, in the embodiment of the present invention, the vibration period of the hydrocarbon concentration is made from 0.3 second to 5 seconds.

Figure 19A:
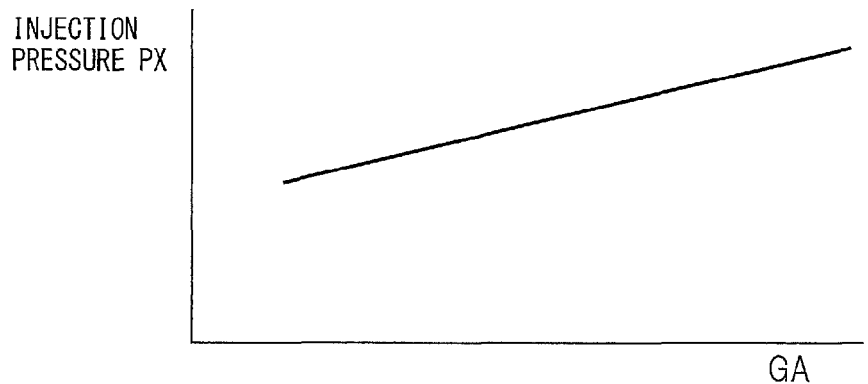
FIGS. 19A, 19B and 19C are views which show the relationship between an injection pressure PX and a flow rate of exhaust gas etc.

Now, if the flow amount of the exhaust gas increases, the flow rate of the exhaust gas becomes higher, and, to make the later injected hydrocarbons superpose with the previously injected group of hydrocarbons G when the flow rate of the exhaust gas becomes higher, the previously injected hydrocarbons have to be fed more to the upstream side compared with when the flow rate of the exhaust gas is low. In this case, to feed the previously injected hydrocarbons more to the upstream side, the penetrating force of the previously injected hydrocarbons has to be raised. For this, it is necessary to raise the injection pressure PX of the previously injected hydrocarbons. Therefore, in this embodiment according to the present invention, as shown in FIG. 19A, the injection pressure PX at the time of injection start is raised as the flow amount of the exhaust gas, that is, the flow amount GA of intake air, increases.

In this case, the injection pressure PX at the time of injection end is maintained at the injection pressure PX the same as when the flow amount of the exhaust gas is low even if the flow amount of the exhaust gas increases. Therefore, in this embodiment according to the present invention, the greater the flow amount of the exhaust gas, the greater the pressure difference between the injection pressure PX of hydrocarbons at the time of the start of injection and the injection pressure PX of hydrocarbons at the time of the end of injection is made.

On the other hand, if the temperature of the exhaust gas rises, the amount of evaporation of the hydrocarbons which are injected increases. In this case, the particle size of the hydrocarbons which are injected from the hydrocarbon feed valve 15 becomes smaller the higher the injection pressure PX, while the action of reduction of the particle size due to the action of evaporation becomes larger the smaller the particle size of the hydrocarbons which are injected from the hydrocarbon feed valve 15. That is, if the injection pressure PX is low, when the temperature of the exhaust gas becomes higher, the particle size of the hydrocarbons which are injected from the hydrocarbon feed valve 15 does not become that small. As opposed to this, if the injection pressure PX is high, when the temperature of the exhaust gas becomes higher, the particle size of the hydrocarbons which are injected from the hydrocarbon feed valve 15 becomes considerably smaller. If the particle size of the hydrocarbons which are injected becomes smaller, the distance of travel of the hydrocarbons which are injected toward the upstream side becomes shorter. That is, when the temperature of the exhaust gas becomes higher, the higher the injection pressure PX, the shorter the distance of travel of the hydrocarbons which are injected toward the upstream side.

Figure 19B:
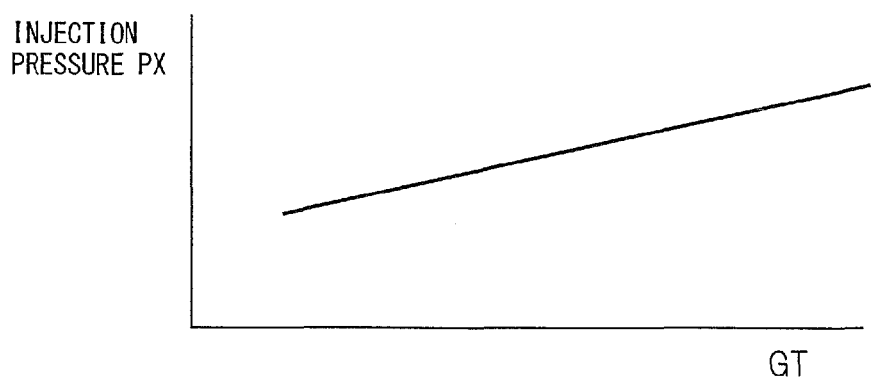

In this case, to make the later injected hydrocarbons superpose with the previously injected group of hydrocarbons G, it is necessary to lengthen the distance of travel of the previously injected hydrocarbons toward the upstream side. To lengthen the distance of travel of the previously injected hydrocarbons toward the upstream side, it is necessary to raise the penetrating force of the previously injected hydrocarbons. For that, it is necessary to raise the injection pressure PX of the previously injected hydrocarbons. Therefore, in this embodiment according to the present invention, as shown in FIG. 19B, the injection pressure PX at the time of injection start is raised as the temperature GT of the exhaust gas becomes higher.

Figure 19C:
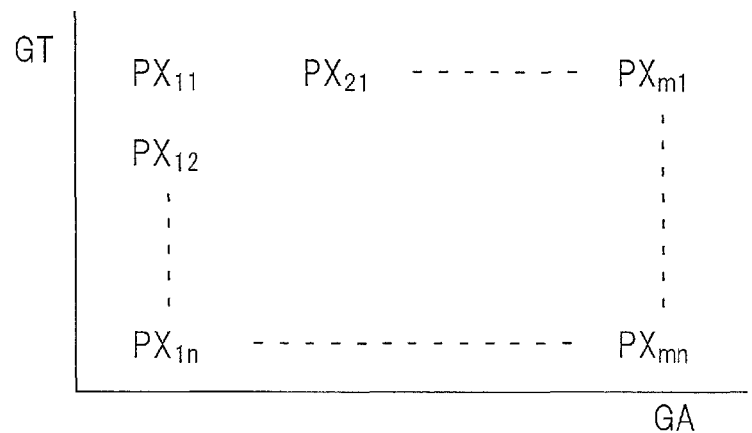

In this case, the injection pressure PX at the time of injection end is maintained at the same injection pressure as when the temperature of the exhaust gas is low even when the temperature GT of the exhaust gas becomes high. Therefore, in this embodiment according to the present invention, the higher the temperature of the exhaust gas, the greater the pressure difference between the injection pressure PX of hydrocarbons at the time of the start of injection and the injection pressure PX of hydrocarbons at the time of the end of injection. Note that, this injection pressure PX at the time of the start of injection is stored as a function of the intake air amount GA and the temperature GT of the exhaust gas in the form of a map such as shown in FIG. 19C in advance in the ROM 32.

Figure 20A:
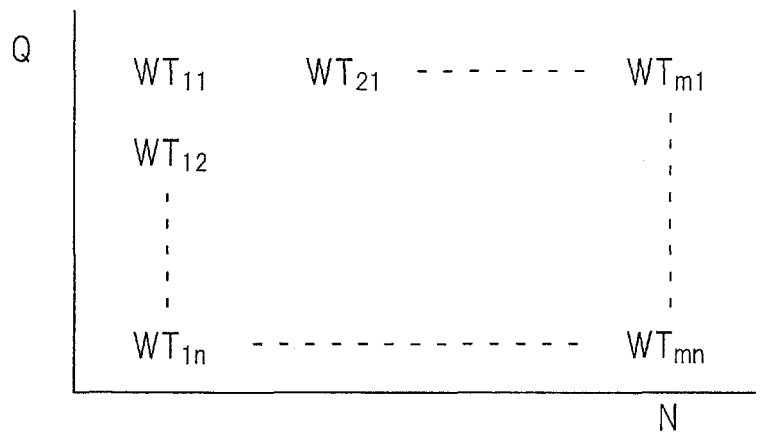
FIGS. 20A, 20B and 20C are views which show the injection period WT etc.
Figure 20B:
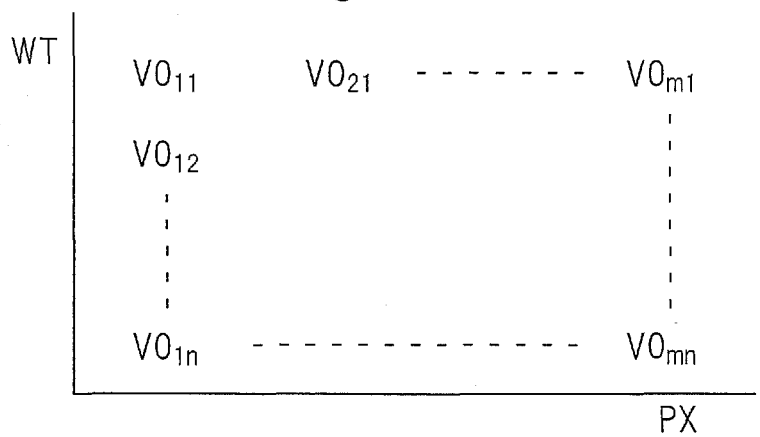
Figure 20C:
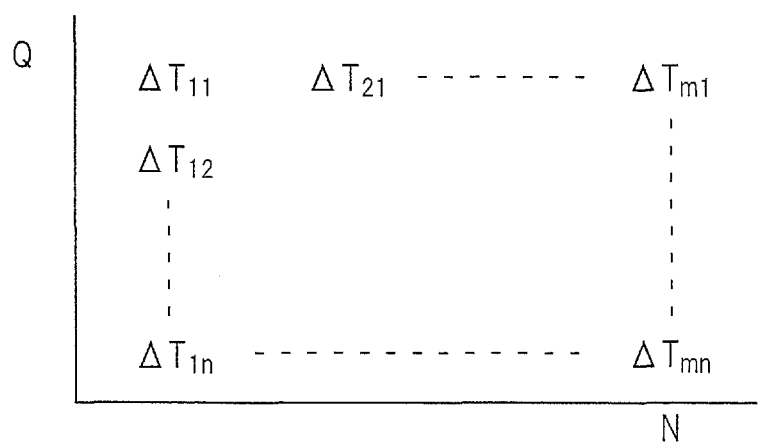

On the other hand, there is an optimum value of the amount of injection of hydrocarbons which is required for removing $NO_X$ well by the first $NO_X$ removal method in accordance with the engine operating state. This optimum value of the amount of injection is found in advance by experiments. In this embodiment according to the present invention, the injection time WT and the drive voltage VO of the actuator 61 for adjustment of the volume of volume-adjusting chamber 61a by which this amount of injection of hydrocarbons becomes this optimum value and by which the later injected hydrocarbons can be made to superpose with the previously injected group of hydrocarbons G are stored in advance. For example, the injection time WT is stored as a function of the amount of injection Q from the fuel injector 3 and the engine speed N in the form of a map such as shown in FIG. 20A in advance in the ROM 32, while the drive voltage VO of the actuator 61c is stored as a function of the injection time WT and injection pressure PX in the form of a map such as shown in FIG. 20B in advance in the ROM 32. Further, the optimum injection period ΔT of hydrocarbons from the hydrocarbon feed valve 15 is also stored as a function of the amount of injection Q from the fuel injector 3 and the engine speed N in the form of a map such as shown in FIG. 20C in advance in the ROM 32.

Next, referring to FIG. 21 to FIG. 24, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 21:
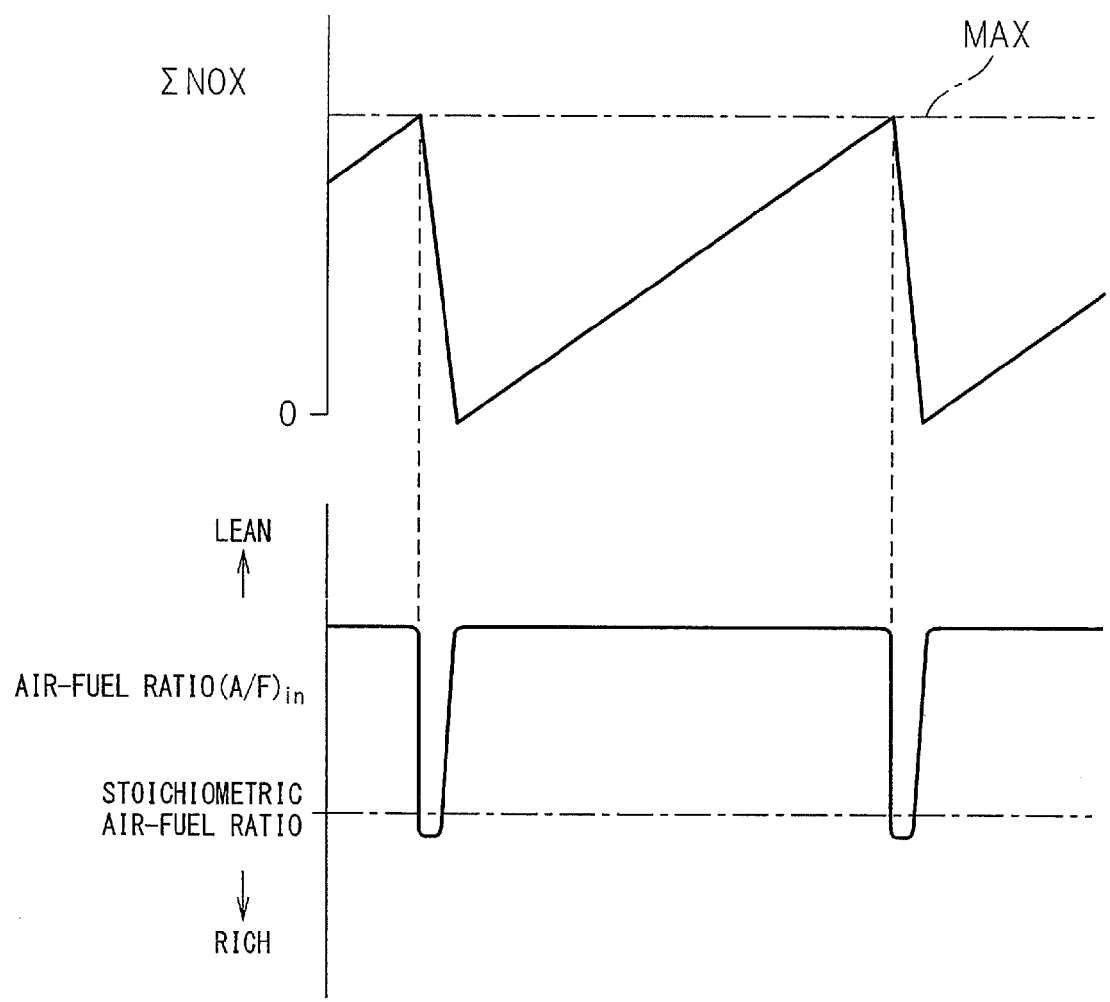
FIG. 21 is a view which shows $NO_X$ release control.

In this second $NO_X$ purification method, as shown in FIG. 21, when the stored $NO_X$ amount $\Sigma NO_X$ of $NO_X$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_X$ which was stored in the basic layer 53 when the air-fuel ratio (A/F)in of the exhaust gas was lean is released from the basic layer 53 all at once and reduced. Due to this, the $NO_X$ is removed.

Figure 22:
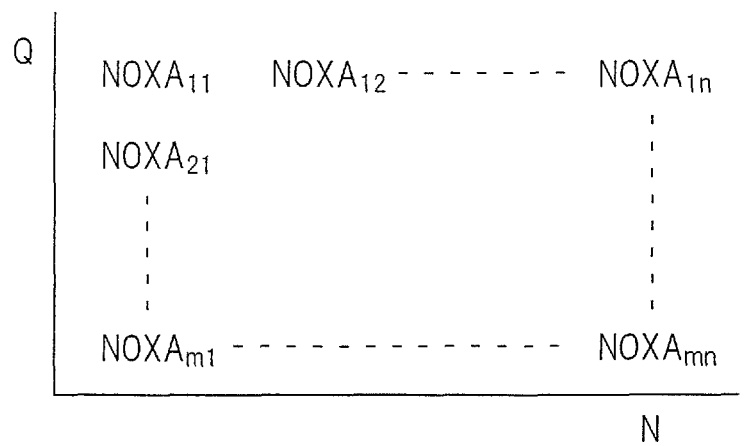
FIG. 22 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 22 in advance in the ROM 32. The stored $NO_X$ amount $\Sigma NO_X$ is calculated from the exhausted $NO_X$ amount NOXA. In this case, as explained before, the period during which the air-fuel ratio (A/F)in of the exhaust gas is made rich is usually 1 minute or more.

Figure 23:
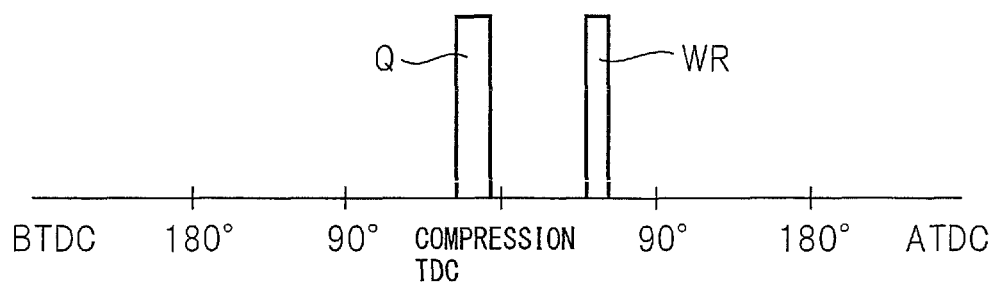
FIG. 23 is a view which shows a fuel injection timing.
Figure 24:
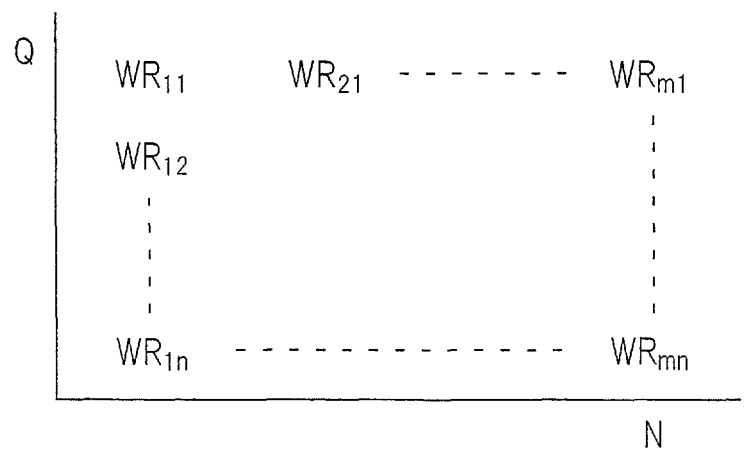
FIG. 24 is a view which shows a map of an additional fuel amount WR.

In this second $NO_X$ purification method, as shown in FIG. 23, in each combustion chamber 2, the fuel injector 3 injects additional fuel WR in addition to the combustion-use fuel Q so that the air-fuel ratio (A/F)in of the exhaust gas which flows into the exhaust purification catalyst 13 is made rich. Note that, in FIG. 23, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 24 in advance in the ROM 32. Of course, in this case, it is also possible to make the injection amount of hydrocarbons from the hydrocarbon feed valve 15 increase so as to make the air-fuel ratio (A/F)in of the exhaust gas rich.

Figure 25:
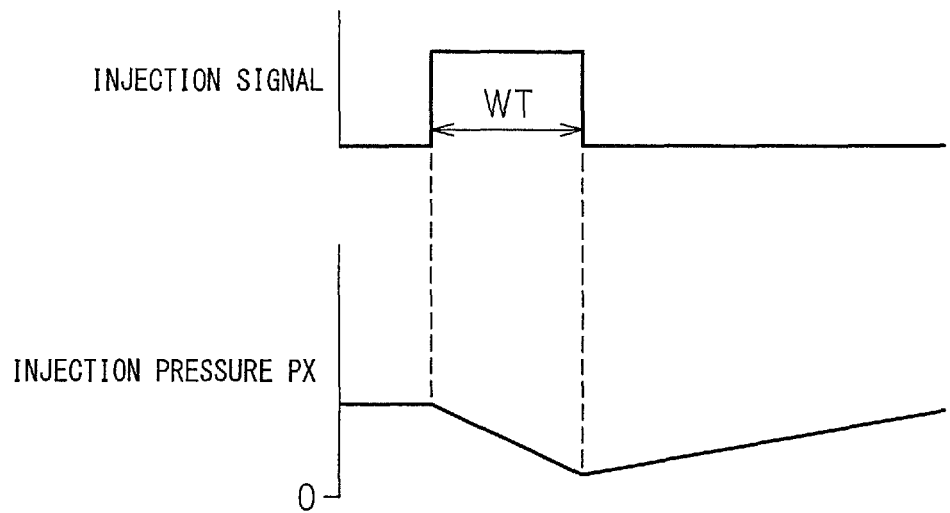
FIG. 25 is a view which shows changes in an injection pressure PX.
Figure 26:
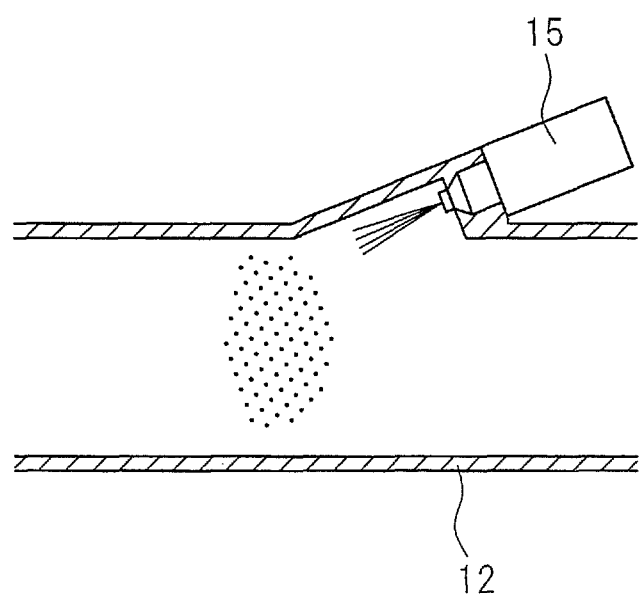
FIG. 26 is a view for explaining a behavior of a crowd of hydrocarbons injected from a hydrocarbon injector.

Now, in this embodiment according to the present invention, when regenerating the particulate filter 14, control is performed to raise the temperature of the particulate filter 14. Even when releasing the $SO_X$ which is stored in the exhaust purification catalyst 13, control is performed to raise the temperature of the exhaust purification catalyst 13. The control for raising the temperatures of the particulate filter 14 and exhaust purification catalyst 13 is performed by causing the hydrocarbons which are injected from the hydrocarbon feed valve 15 to react by oxidation under an excess of oxygen on the particulate filter 14 and exhaust purification catalyst 13. FIG. 25 shows the changes of the injection signal to the hydrocarbon feed valve 15 and the injection pressure PX of the hydrocarbon feed valve 15 when performing control to raise the temperature of the particulate filter 14 or the exhaust purification catalyst 13, while FIG. 26 shows the state of injection of hydrocarbons from the hydrocarbon feed valve 15 at this time.

In this regard, at the time of control for raising the temperatures of the particulate filter 14 and exhaust purification catalyst 13, to make the hydrocarbons injected from the hydrocarbon feed valve 15 react by oxidation well under an excess of oxygen on the particulate filter 14 and exhaust purification catalyst 13, it is necessary to inject hydrocarbons so that the particles of the hydrocarbons injected from the hydrocarbon feed valve 15 are surrounded by large amounts of oxygen. That is, when removing $NO_X$ by the first $NO_X$ removal method, as explained above, the hydrocarbons which are injected from the hydrocarbon feed valve 15 are gathered together to raise the concentration of hydrocarbons, but when raising the temperatures of the particulate filter 14 and exhaust purification catalyst 13, conversely to this, it is necessary to make the hydrocarbons which are injected from the hydrocarbon feed valve 15 disperse. In this case, if the injection pressure PX of the hydrocarbon feed valve 15 becomes low, the particles of the injected hydrocarbons are made to become larger in size, and the hydrocarbons are dispersed so that the hydrocarbons are surrounded by a large amount of oxygen. Therefore, when performing control to raise the temperatures of the particulate filter 14 and exhaust purification catalyst 13, as shown in FIG. 25, the injection pressure PX of the hydrocarbon feed valve 15 at the time of the start of injection is lowered compared with when the action of removing $NO_X$ by the first $NO_X$ removal method, that is, when hydrocarbons are injected from the hydrocarbon feed valve 15 by a predetermined period.

Figure 27:
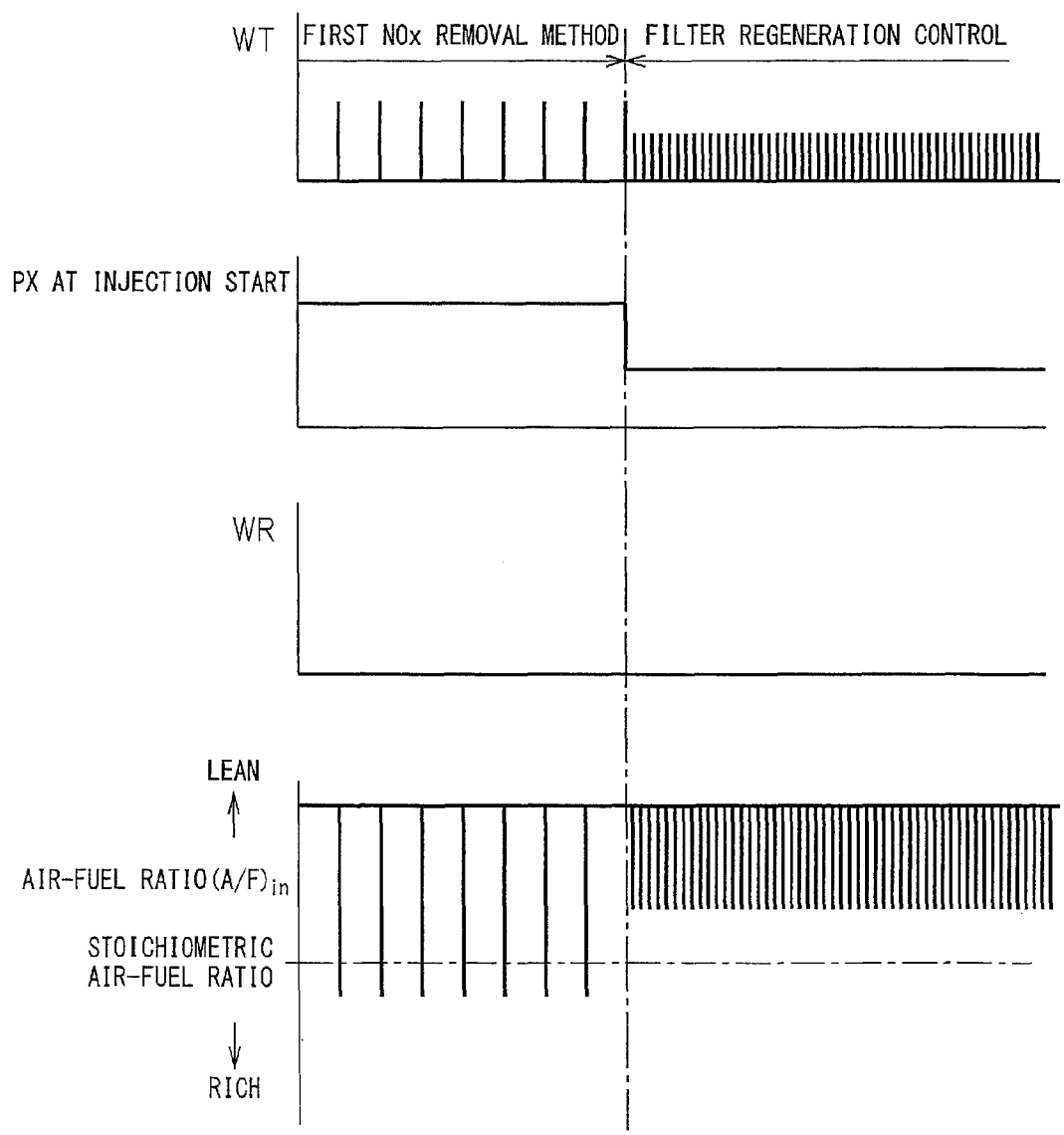
FIG. 27 is a view which shows a first $NO_X$ purification method and a regeneration control of particulate filter.

Now, in this embodiment according to the present invention, when the engine load is low, the action of removal of $NO_X$ by the second $NO_X$ removal method is performed, while when the engine load becomes high, the action of removal of $NO_X$ by the first $NO_X$ removal method is performed. FIG. 27 shows the changes in the injection time period WT of the hydrocarbon feed valve 15, the injection pressure PX of the hydrocarbon feed valve 15 at the time of injection start, the additional injected fuel amount WR from the fuel injector 3, and the air-fuel ratio (A/F)in of the exhaust gas which flows into the exhaust purification catalyst 13 when the action of removal of $NO_X$ by the first $NO_X$ removal method is performed and when the control for regeneration of the particulate filter 14 is being performed, while FIG. 28 shows the changes in the injection time period WT of the hydrocarbon feed valve 15, the injection pressure PX of the hydrocarbon feed valve 15 at the time of injection start, the additional injected fuel amount WR from the fuel injector 3, and the air-fuel ratio (A/F)in of the exhaust gas which flows into the exhaust purification catalyst 13 when the action of removal of $NO_X$ by the second $NO_X$ removal method is performed and when the $SO_X$ release control from the exhaust purification catalyst 13 is being performed.

As shown in FIG. 27, when the regenerating control of the particulate filter 14 is performed, compared with when the action of removal of $NO_X$ by the first $NO_X$ removal method is performed, the injection time period WT and the injection period ΔT of the hydrocarbon feed valve 15 become shorter and the injection pressure PX of the hydrocarbon feed valve 15 at the time of injection start is made lower. Note that, as will be understood from FIG. 27, when the regenerating control of the particulate filter 14 is performed, the action of injection of hydrocarbons from the hydrocarbon feed valve 15 is performed while maintaining the air-fuel ratio of the exhaust gas (A/F)in which flows into the exhaust purification catalyst 13 lean.

Figure 28:
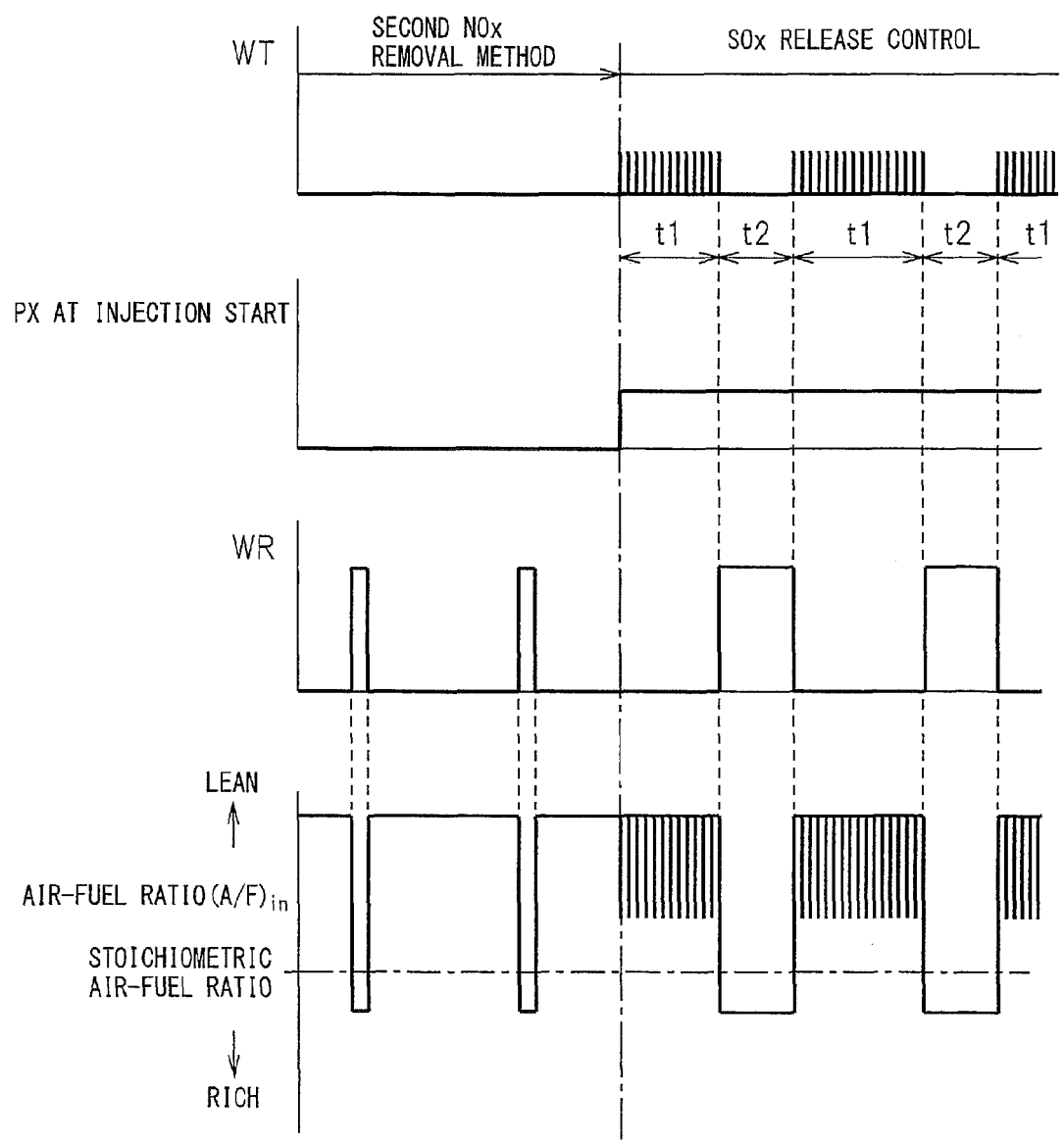
FIG. 28 is a view which shows a second $NO_X$ purification method and a $SO_X$ release control.

On the other hand, as shown in FIG. 28, when performing control for release of $SO_X$ from the exhaust purification catalyst 13, temperature raising control of the exhaust purification catalyst 13 or temperature maintaining control which maintains the temperature of the exhaust purification catalyst 13 at 600° C. or so, as shown at t1, and rich control which injects additional injected fuel WR from the fuel injector 3 to make the air-fuel ratio (A/F)in of the exhaust gas which flows into the exhaust purification catalyst 13 rich so as to make the exhaust purification catalyst 13 release $SO_X$, as shown at t2, are alternately repeated. When the temperature raising control of the exhaust purification catalyst 13 or the temperature maintaining control which maintains the temperature of the exhaust purification catalyst 13 at about 600° C., as shown by t1, is performed, in the same way as when control is performed for regeneration of the particulate filter 14 which is shown in FIG. 27, compared with when the action of removal of $NO_X$ by the first $NO_X$ removal method is performed, the injection time period WT and the injection period ΔT of the hydrocarbon feed valve 15 become shorter and the injection pressure PX of the hydrocarbon feed valve 15 at the time of injection start is made lower. In addition, the action of injection of hydrocarbons from the hydrocarbon feed valve 15 is performed while maintaining the air-fuel ratio (A/F)in of the exhaust gas which flows into the exhaust purification catalyst 13 lean.

Figure 29:
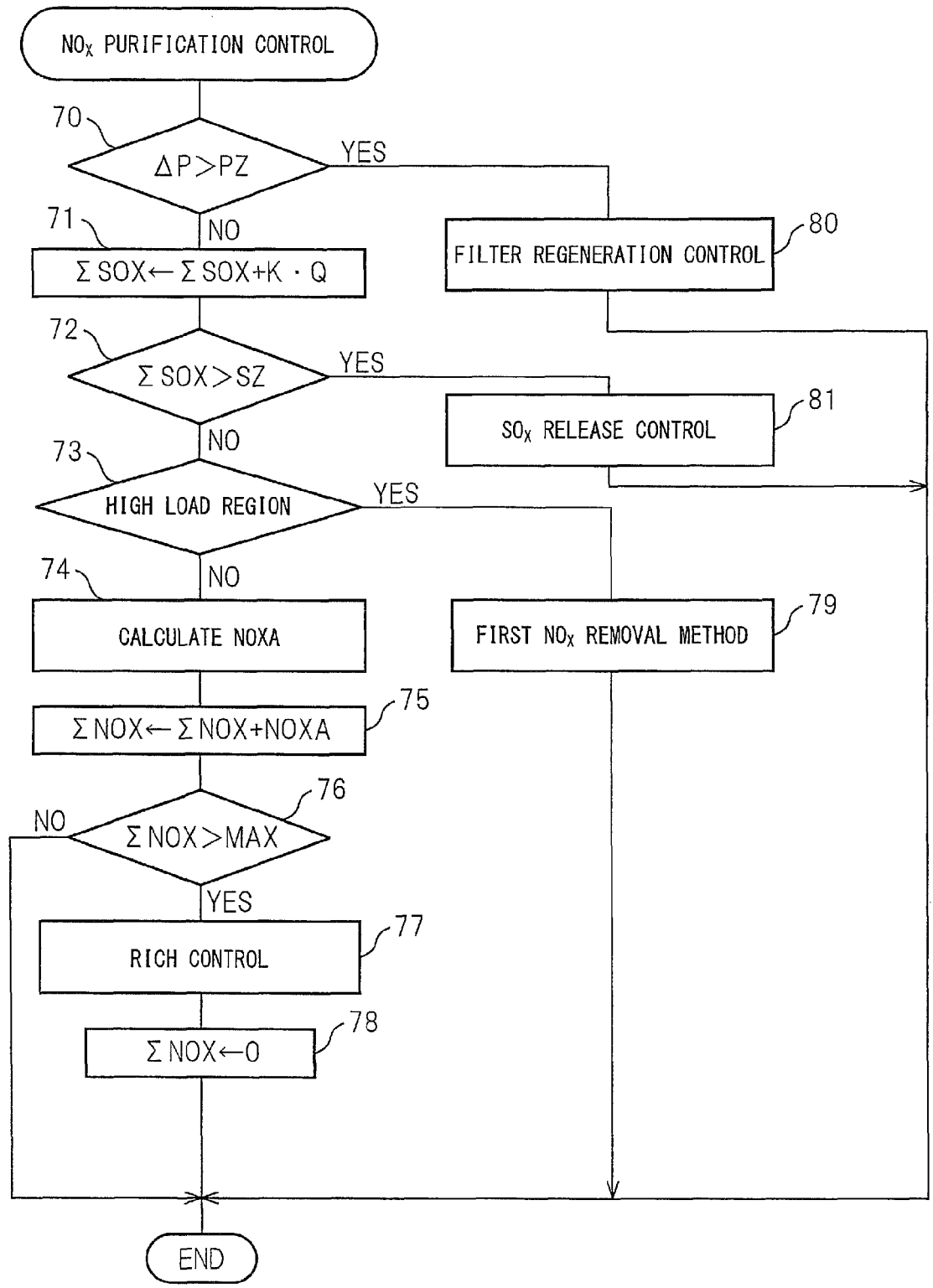
FIG. 29 is a flow chart for performing a $NO_X$ purification control.

FIG. 29 shows the $NO_X$ purification control routine. This routine is executed by interruption every certain time period. Referring to FIG. 29, first, at step 70, it is judged if a pressure difference ΔP before and after the particulate filter 14 which is detected by the pressure sensor 24 exceeds the allowable value PZ. When the pressure difference ΔP before and after the particulate filter 14 does not exceed the allowable value PZ, the routine proceeds to step 71 where the $SO_X$ amount ΣSOX which is stored in the exhaust purification catalyst 13 is calculated. The fuel which is injected from the fuel injector 3 contains a certain ratio of sulfur. Therefore, at step 71, by cumulatively adding the value obtained by multiplying a constant K with the amount of fuel injection Q from the fuel injector 3, the $SO_X$ amount ΣSOX which is stored in the exhaust purification catalyst 13 is calculated. Next, the routine proceeds to step 72.

At step 72, it is judged if the stored $SO_X$ amount ΣSOX exceeds the allowable $SO_X$ amount SZ. When the stored $SO_X$ amount ΣSOX does not exceed the allowable $SO_X$ amount SZ, the routine proceeds to step 73 where it is judged if the engine operating state is the predetermined high load operating region. When the engine operating state is not the predetermined high load operating region, the routine proceeds to step 74 where the $NO_X$ removal action by the second $NO_X$ removal method is performed.

That is, at step 74, the $NO_X$ amount NOXA exhausted per unit time is calculated from the map which is shown in FIG. 22. Next, at step 75, the exhausted $NO_X$ amount NOXA is added to ΣNOX whereby the stored $NO_X$ amount ΣNOX is calculated. Next, at step 76, it is judged if the stored $NO_X$ amount ΣNOX exceeds an allowable value MAX. If ΣNOX>MAX, the routine proceeds to step 77 where the additional fuel amount WR is calculated from the map which is shown in FIG. 24 and an injection action of additional fuel from the fuel injector 3 is performed. Next, at step 78, ΣNOX is cleared.

As opposed to this, when it is judged at step 73 that the engine operating state is the high load operating region, the routine proceeds to step 79 where the $NO_X$ removal action by the first $NO_X$ removal method which is shown in FIG. 27 is performed. On the other hand, when it is judged at step 70 that the pressure difference ΔP before and after the particulate filter 14 exceeds the allowable value PZ, the routine proceeds to step 80 where the regeneration control of the particulate filter 14 which is shown in FIG. 27 is performed. Further, when it is judged at step 72 that the stored $SO_X$ amount ΣSOX exceeds the allowable $SO_X$ amount SZ, the routine proceeds to step 81 where the $SO_X$ release control from the exhaust purification catalyst 13 which is shown in FIG. 28 is performed.

Note that, as another embodiment, it is also possible to arrange an oxidation catalyst for reforming the hydrocarbons in the engine exhaust passage upstream of the exhaust purification catalyst 13.

REFERENCE SIGNS LIST 4. intake manifold
5. exhaust manifold 7. exhaust turbocharger
12. exhaust pipe
13. exhaust purification catalyst
14. particulate filter
15. hydrocarbon feed valve

The invention claimed is:

1. An exhaust purification system of an internal combustion engine comprising:
   an exhaust purification catalyst arranged in an engine exhaust passage, exhaust gas flow surfaces of the exhaust purification catalyst carrying precious metal catalysts thereon, basic exhaust gas flow surface parts formed around the precious metal catalysts, the exhaust purification catalyst having a property of reducing $NO_x$ which is contained in an exhaust gas when a concentration of hydrocarbons which flow into the exhaust purification catalyst is made to vibrate within a predetermined range of amplitude and within a predetermined range of period, the exhaust purification catalyst having a property of increasing a storage amount of $NO_x$ contained in the exhaust gas when the vibration period of the hydrocarbon concentration is made longer than the predetermined range of period;
   a hydrocarbon feed valve arranged in the engine exhaust passage upstream of the exhaust purification catalyst, the hydrocarbon feed valve being oriented to inject the hydrocarbons in an upstream direction of the engine exhaust passage; and
   an electronic control unit coupled to the hydrocarbon feed valve and configured to control injection of the hydrocarbons by the hydrocarbon feed valve so that, at a time of engine operation, the hydrocarbons are injected from the hydrocarbon feed valve within the predetermined range of period to thereby remove the $NO_x$ which is contained in the exhaust gas while gradually reducing an injection pressure of the hydrocarbons from a start of the injection toward an end of the injection during each injection period, the injection pressure of the hydrocarbons at the start of the injection and the injection pressure of the hydrocarbons at the end of the injection being set so that the hydrocarbons which are injected later are superposed in the engine exhaust passage with the hydrocarbons that were previously injected.

2. The exhaust purification system as claimed in claim 1, further comprising a sensor that measures a flow amount of the exhaust gas, and wherein the electronic control unit is configured to increase a pressure difference between the injection pressure of the hydrocarbons at the start of the injection and the injection pressure of the hydrocarbons at the end of the injection as the measured flow amount increases.

3. The exhaust purification system as claimed in claim 1, further comprising a sensor that measures a temperature of the exhaust gas, and wherein the electronic control unit is configured to increase a pressure difference between the injection pressure of the hydrocarbons at the start of the injection and the injection pressure of the hydrocarbons at the end of the injection as the measured temperature increases.

4. The exhaust purification system as claimed in claim 1, further comprising a particulate filter arranged in the engine exhaust passage, and wherein the electronic control unit is configured to control the hydrocarbon feed valve so that when the hydrocarbons are injected from the hydrocarbon feed valve to raise a temperature of the particulate filter, the injection pressure of the hydrocarbons at the start of the injection is made lower than when the hydrocarbons are injected from the hydrocarbon feed valve within the predetermined range of period.

5. The exhaust purification system as claimed in claim 1, wherein the electronic control unit is configured to control the hydrocarbon feed valve so that the injection pressure of the hydrocarbons is made lower at the start of the injection when the hydrocarbons are injected from the hydrocarbon feed valve so as to raise a temperature of the exhaust purification catalyst compared to the injection pressure of the hydrocarbons when the hydrocarbons are injected within the predetermined period.

* * * * *